United States Patent
Park et al.

(10) Patent No.: US 7,984,132 B2
(45) Date of Patent: Jul. 19, 2011

(54) MULTI-RATE PEER DISCOVERY METHODS AND APPARATUS

(75) Inventors: Vincent D. Park, Budd Lake, NJ (US); Thomas Richardson, South Orange, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 12/163,254

(22) Filed: Jun. 27, 2008

(65) Prior Publication Data

US 2009/0327395 A1 Dec. 31, 2009

(51) Int. Cl.
*G06F 15/16* (2006.01)

(52) U.S. Cl. ...................................................... 709/223

(58) Field of Classification Search .................... 709/220
See application file for complete search history.

(56) References Cited

U.S. PATENT DOCUMENTS

| | | | |
|---|---|---|---|
| 6,975,614 B2 | 12/2005 | Kennedy | |
| 2006/0222913 A1* | 10/2006 | Suzuki | ............................ 429/22 |
| 2007/0149194 A1* | 6/2007 | Das et al. | ...................... 455/436 |
| 2007/0211678 A1 | 9/2007 | Li et al. | |
| 2009/0040996 A1* | 2/2009 | Laroia et al. | .................. 370/343 |

FOREIGN PATENT DOCUMENTS

| | | |
|---|---|---|
| WO | WO0192992 A2 | 12/2001 |
| WO | WO2005064863 | 7/2005 |

OTHER PUBLICATIONS

International Search Report for PCT/US2009/048927, International Searching Authority—European Patent Office, Dec. 11, 2009.

* cited by examiner

*Primary Examiner* — Tammy T Nguyen
(74) *Attorney, Agent, or Firm* — Peng Zhu; James K. O'Hare

(57) ABSTRACT

Wireless communications devices, e.g., peer to peer mobile wireless terminals in and ad-hoc peer to peer communications network, support multiple modes of peer discovery operation. In different peer discovery transmit modes peer discovery information is transmitted at different rates. In different peer discovery receive modes peer discovery information is monitored at different rates. Performing peer discovery operations at a higher rate has the benefit of reducing discovery latency at the cost of utilizing more communications resources and expending more power. A communications device dynamically changes its mode in response to changing conditions and/or needs. Transitions between modes are in response to a determined change condition trigger occurrence. Various change condition triggers include, e.g., a user event, an application event, information received over the air interface, information derived from information received over the air interface and/or temporal information.

30 Claims, 24 Drawing Sheets

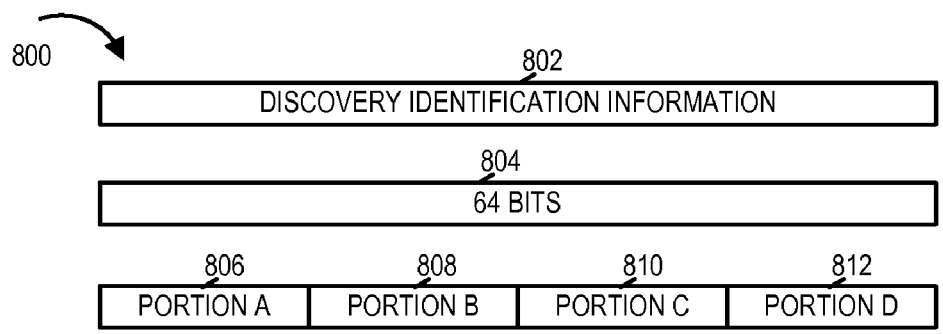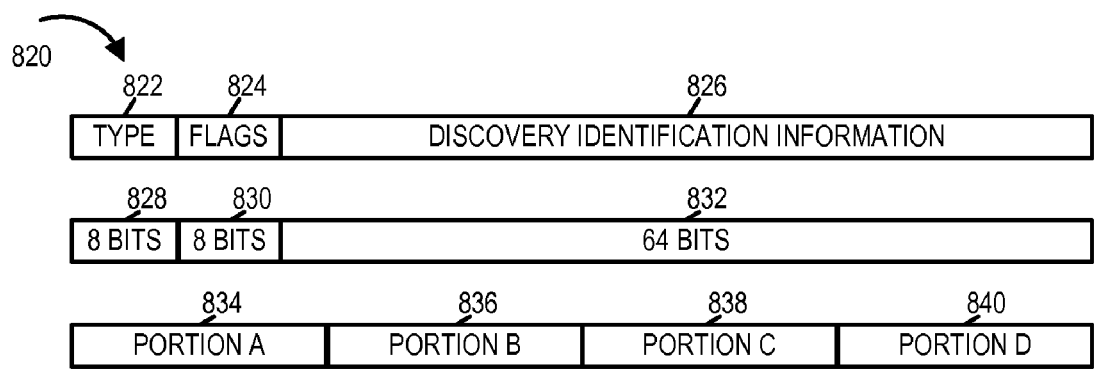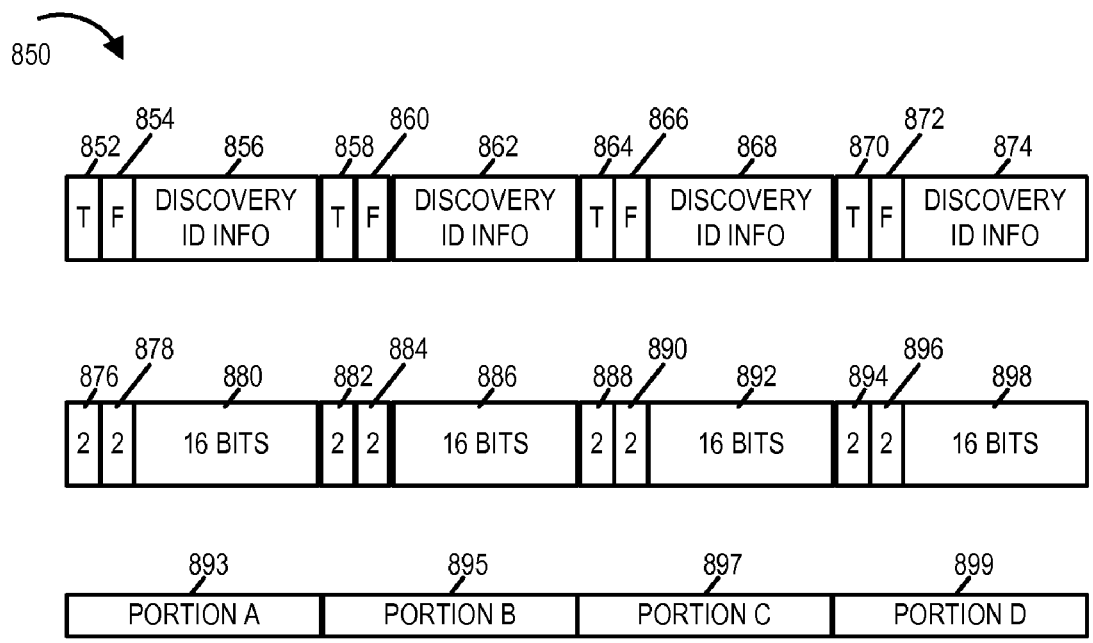
FIGURE 8

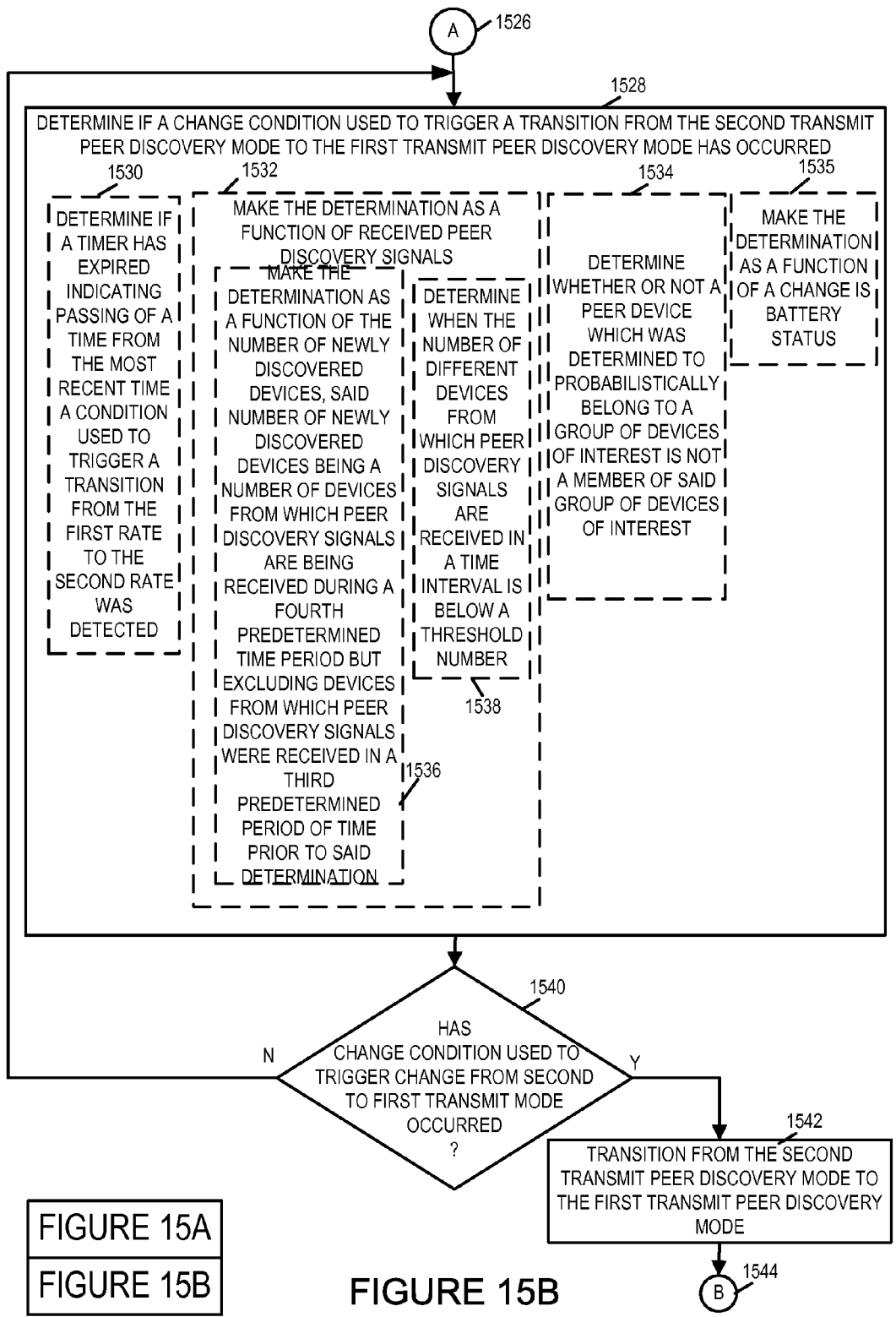

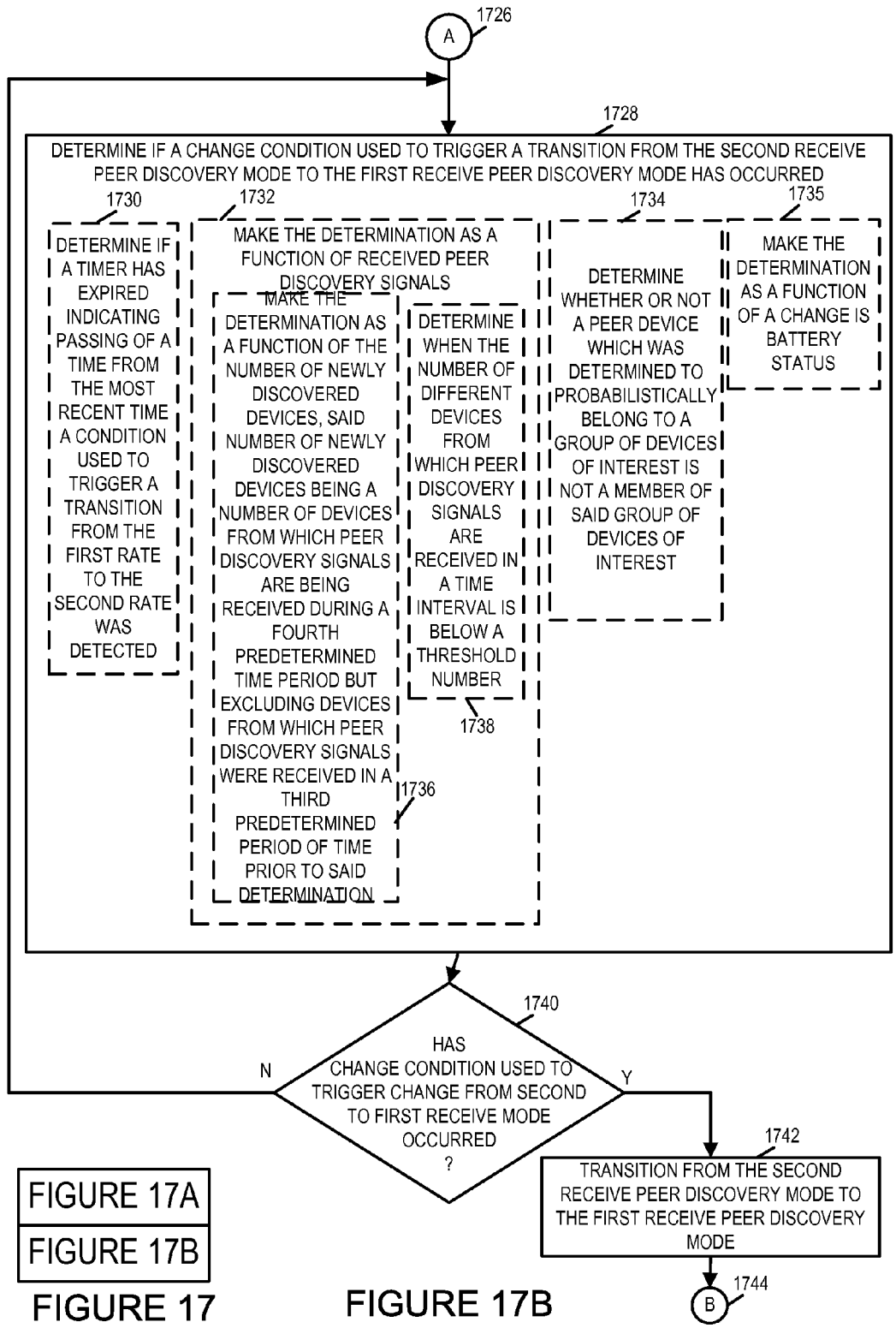

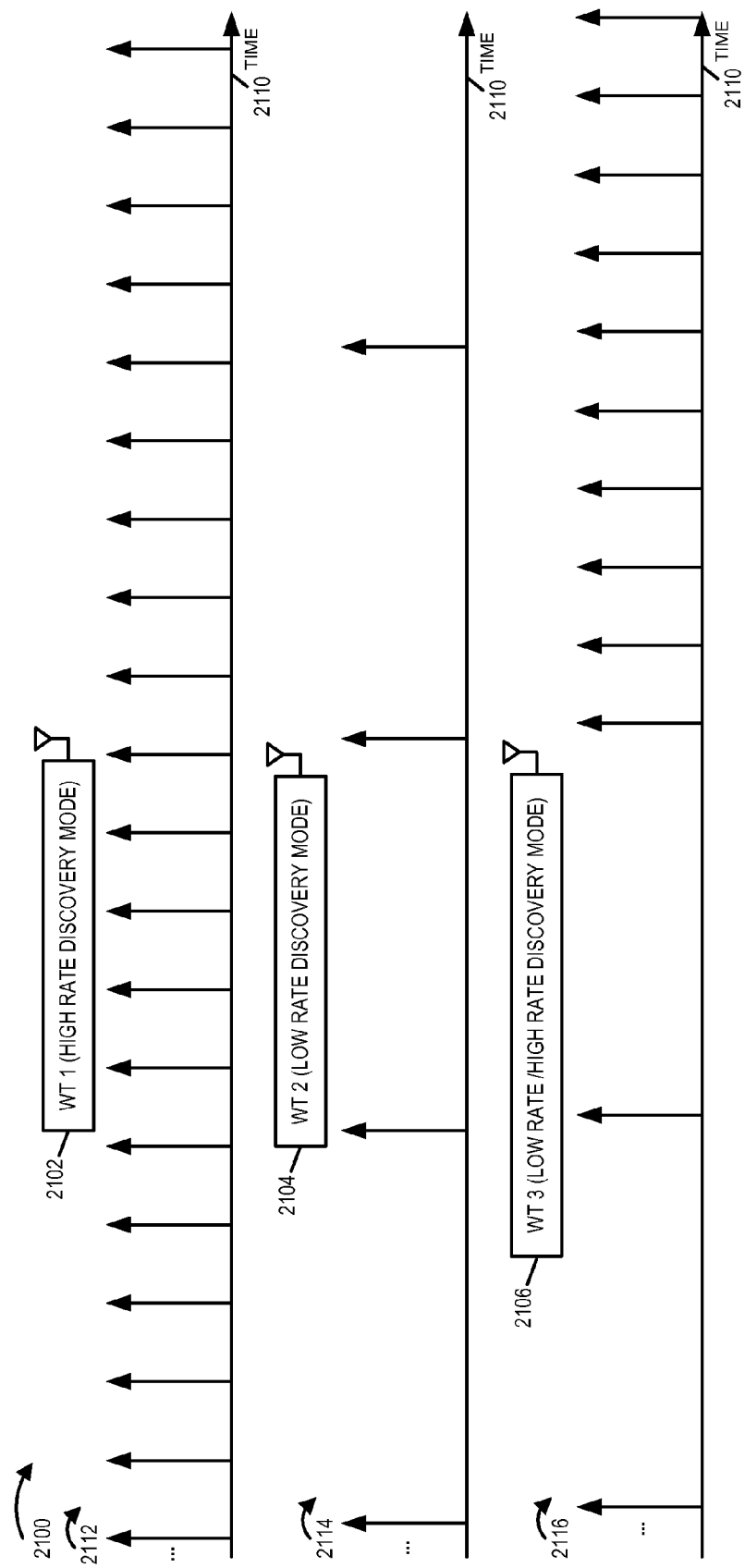

MULTI-RATE PEER DISCOVERY METHODS AND APPARATUS

FIELD

Various embodiments relate to wireless communications, and more particularly, to methods and apparatus related to the communication of peer discovery information.

BACKGROUND

In a wireless network, e.g., an ad hoc peer to peer wireless network, it can be beneficial for a wireless communications device, e.g., a mobile node, to support the ability to transmit, e.g., broadcast, various types of discovery information, e.g., peer discovery information, network discovery information and/or service discovery information. The broadcasting of such information can be used by other peer devices currently in its local vicinity to form a situational awareness. This exchange of wireless device broadcast discovery information among peers can be particularly useful in a network lacking centralized coordination and/or control. Different wireless communications devices may have different capabilities and/or needs with regard to the transmission and/or reception of discovery information. In addition, an individual wireless communications device may, at different times, have different capabilities and/or needs with regard to the transmission and/or reception of discovery information. Broadcasting and/or receiving discovery information may be considered overhead signaling, and resources such as power and spectrum over time expended for discovery information signaling may be unavailable for traffic signaling. The power expended by a mobile wireless communications device for transmitting and/or receiving discovery information and the reserve battery power remaining are important considerations in implementing a structure supporting the communication of discovery information.

Based on the above discussion it should be appreciated that there is a need for methods and/or apparatus that support the communication of a wide range of different types of discovery information in an efficient manner and that methods and/or apparatus that allow for flexibility in the transmission and/or reception of discovery information would be beneficial.

SUMMARY

Various embodiments are related to methods and apparatus for use in a mobile wireless system that enables direct wireless communications between subscriber devices, e.g., an ad hoc peer-to-peer network. In some embodiments, a process referred to as peer discovery enables autonomous detection of peers, networks and/or services of interest to a particular subscriber device. In some instance implemented peer discovery methods and apparatus support multiple rates of sending and/or monitoring peer discovery information. Thus at a given location and time, some subscriber devices may be performing peer discovery at one rate, e.g., a low rate, while other devices may be performing peer discovery at another rate, e.g., a high rate. In general, performing peer discovery operations at a higher rate has the benefit of reducing latency at the cost of utilizing more communications resources and expending more power, e.g., reducing battery lifetime. In accordance with a feature of some embodiments, a subscriber device, participating in peer discovery dynamically adapts its rate of sending and/or monitoring peer discovery information.

Various embodiments include one or more of a wide range of approaches and triggers for controlling the dynamic adaptation. For example, in some instances, a peer discovery rate change, e.g., from a low rate of operation to high rate operation, can be triggered by a user and/or application event, e.g., starting an application, selecting or transitioning to a particular application mode, or choosing a particular menu option. In other instances, a peer discovery rate change can be triggered or determined based on information received over the air interface, e.g., detecting a partial match of peer discovery information already being monitored for, detecting a new node within local proximity, or detecting a predetermined rate of change of the set of nodes within local proximity. In still other instances a peer discovery rate change can be triggered or determined based on temporal information, e.g., preconfigured or learned information indicating the time of day, days of the week, etc., when peer discovery should be performed at a given rate. In some embodiments, it is possible to independently control the rate of sending peer discovery information and the rate of monitoring peer discovery information. However, in some embodiments, it may be beneficial to couple the rate of sending and monitoring, and the rate of sending and monitoring are controllably coupled.

An exemplary method of operating a communications device which supports multiple peer discovery modes including a first transmit peer discovery mode during which peer discovery signals are transmitted at a first rate and a second transmit peer discovery mode during which peer discovery signals are transmitted at a second rate, said second rate being higher than the first rate, includes: while operating in said first transmit peer discovery mode, determining if a change condition used to trigger a change from the first mode to the second mode occurred; and upon detecting that said change condition used to trigger a change from the first mode to the second mode has occurred, transitioning from the first mode to the second mode. An exemplary communications device which supports multiple peer discovery modes including a first transmit peer discovery mode during which peer discovery signals are transmitted at a first rate and a second transmit peer discovery mode during which peer discovery signals are transmitted at a second rate, said second rate being higher than the first rate, comprises: a first transition condition detection module for determining if a change condition used to trigger a change from the first mode to the second mode occurred when said communications device is operating in said first mode; and a first mode transition control module for controlling said communications device to transition from the first mode to the second mode when said first transition condition detection module detects that said change condition used to trigger a change from the first mode to the second mode has occurred.

An exemplary method of operating a communications device which supports multiple peer discovery modes including a first receive peer discovery mode during which peer discovery signals are monitored at a first rate and a second receive peer discovery mode during which peer discovery signals are monitored at a second rate, said second rate being higher than the first rate, comprises: while operating in said first receive peer discovery mode, determining if a change condition used to trigger a change from the first mode to the second mode occurred; and upon detecting that said change condition used to trigger a change from the first mode to the second mode has occurred, transitioning from the first mode to the second mode. An exemplary communications device in accordance with some embodiments supports multiple peer discovery modes including a first receive peer discovery mode during which peer discovery signals are monitored at a first rate and a second receive peer discovery mode during which peer discovery signals are monitored at a second rate, said second rate being higher than the first rate, and device comprises: a first transition condition detection module for determining if a change condition used to trigger a change from the first mode to the second mode occurred when said communications device is operating in said first mode; and a first mode transition control module for controlling said communications device to transition from the first mode to the second mode when said first transition condition detection module detects that said change condition used to trigger a change from the first mode to the second mode has occurred.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 8 illustrates 3 exemplary formats for discovery information being conveyed using four output portions corresponding to input discovery information.

FIG. 21 is another drawing illustrating exemplary nodes in a peer to peer communications system and the transmission of discovery information at different rates.

DETAILED DESCRIPTION

Figure 1:
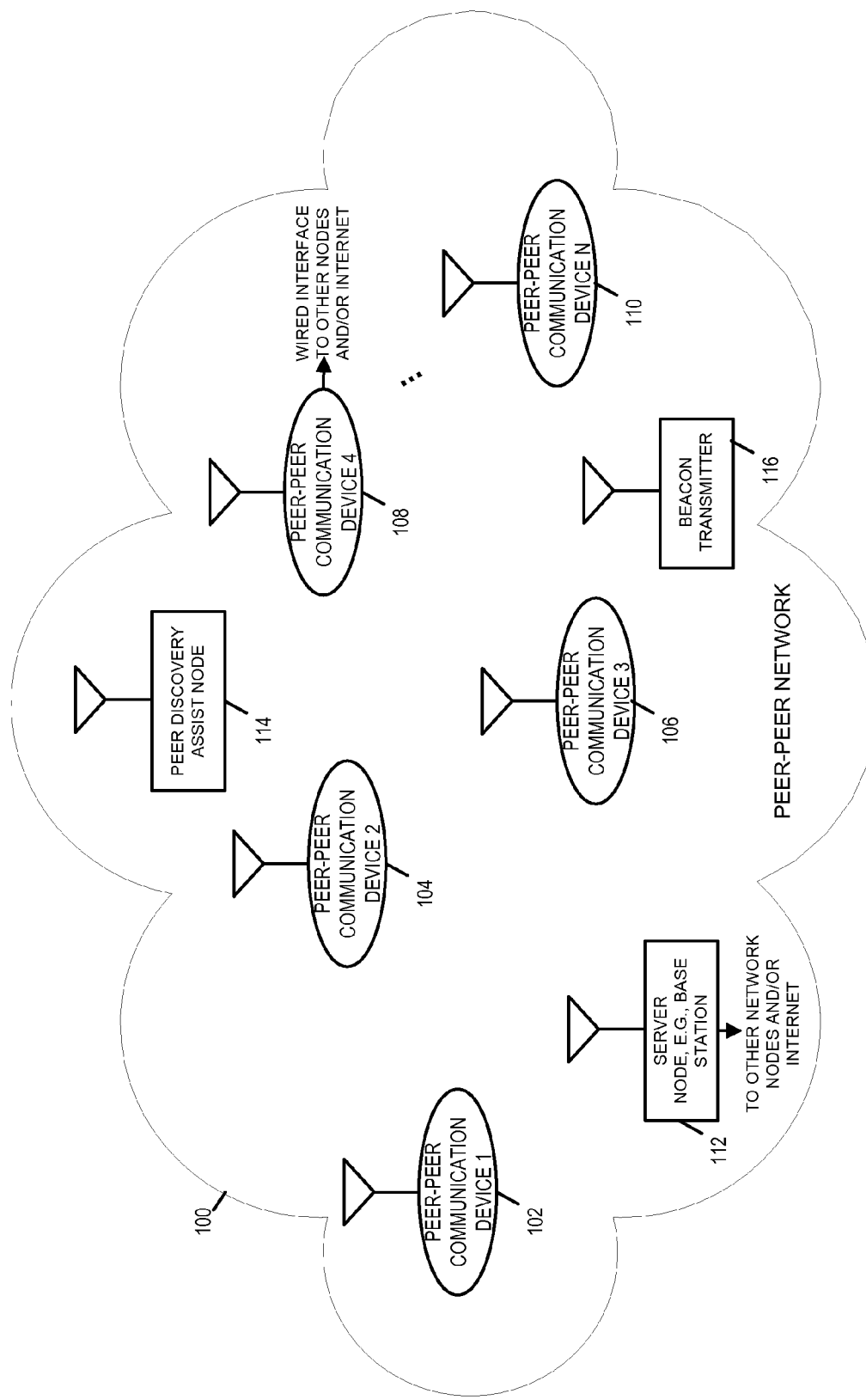
FIG. 1 is a drawing of an exemplary peer to peer network in accordance with an exemplary embodiment.

FIG. 1 is a drawing of an exemplary peer to peer network 100 in accordance with an exemplary embodiment. Peer to peer network 100 includes a plurality of wireless peer to peer communications devices (peer to peer communications device 1 102, peer to peer communications device 2 104, peer to peer communications device 3 106, peer to peer communications device 4 108, . . . , peer to peer communications device N 110). Some of the peer to peer communications devices, e.g., peer to peer communications device 4 108, also include a wired interface which couples the device to other nodes and/or the Internet. The peer to peer communications devices (102, 104, 106, 108, 110) store information defining a peer discovery transmission structure including transmission units to be used for low rate discovery transmissions and additional transmission units to be used for high rate discovery transmissions.

Peer to peer network 100 also includes a peer discovery assist node 114, a server node 112, e.g., a base station, and a beacon transmitter 116. Peer discovery assist node 114 can, and sometimes does, receives portions of one or more sets of peer discovery information from one or more peer to peer communications devices at a first rate and transmits the information over an airlink at a second rate which is faster than the first rate. Similarly, server node 112 can, and sometimes does, receives portions of one or more sets of peer discovery information from a peer to peer communications device at a first rate and transmits the information over an airlink at a second rate which is faster than the first rate. Server node 112 includes both a wireless interface and a wired interface. The wired interface of the server 112 couples the server to other network nodes and/or the Internet. Beacon transmitter 116 transmits a beacon signal, e.g., an OFDM beacon signal having a high power concentration on one or a few tones, which is easily detectable and intended to be utilized by the peer to peer devices in its vicinity to establish a timing reference with respect to the peer to peer timing structure being utilized in the region.

Figure 2:
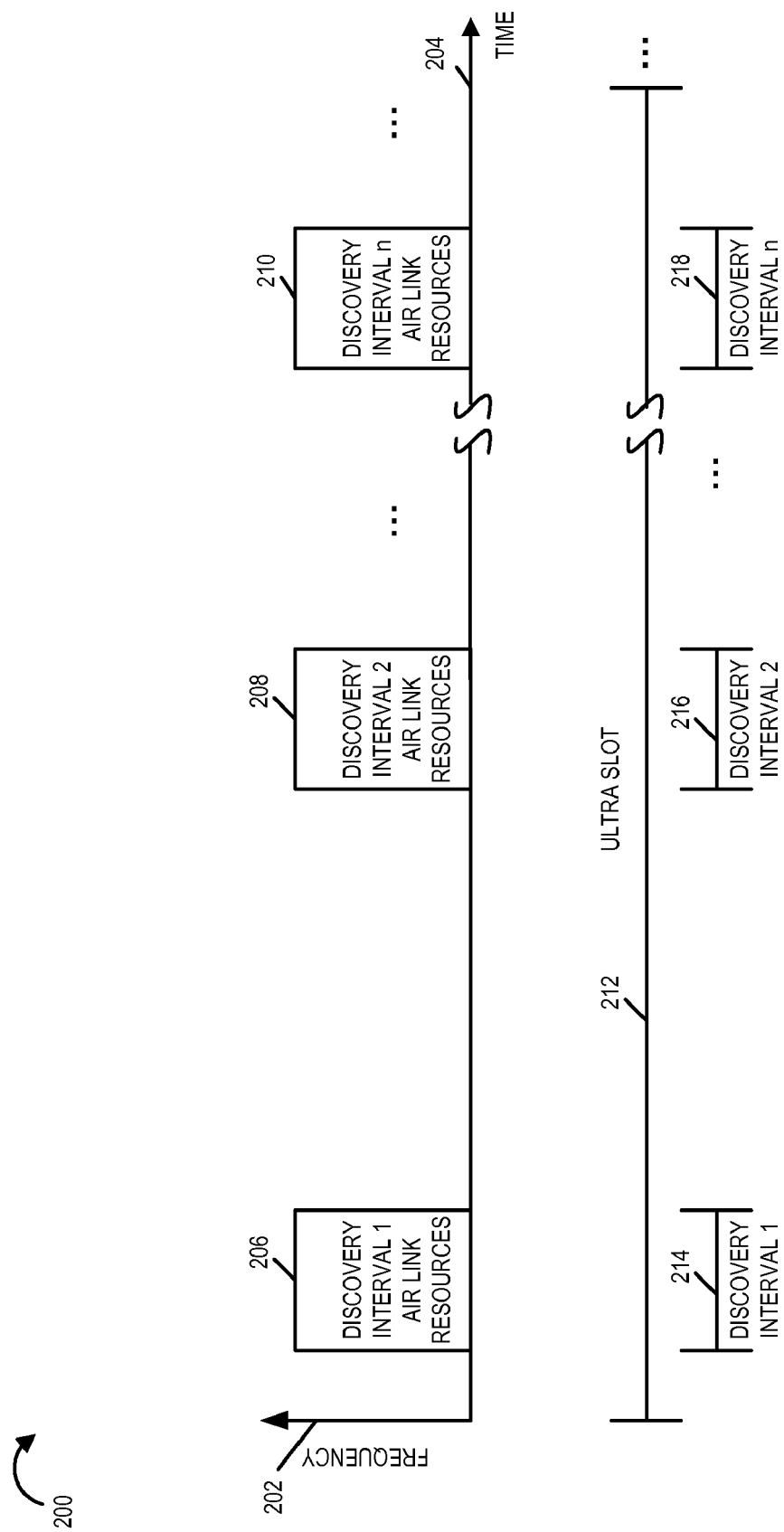
FIG. 2 illustrates discovery intervals and corresponding discovery interval air link resources within a recurring peer to peer timing structure in accordance with an exemplary embodiment.

FIG. 2 includes a drawing 200 illustrating discovery intervals (discovery interval 1 214, discovery interval 2 216, ..., discovery interval n 218) within a recurring peer to peer timing structure including an ultra slot 212. In the recurring peer to peer timing structure the ultra slot repeats. Vertical axis 202 represents frequency, e.g., OFDM tones, while horizontal axis 204 represents time. Corresponding to each of discovery intervals (discovery interval 1 214, discovery interval 2 216, ..., discovery interval n 218) there is a corresponding block of discovery interval air link resources (discovery interval 1 air link resources 206, discovery interval 2 air link resources 208, ..., discovery interval n air link resources 210). Each block of discovery interval air link resources, e.g., discovery interval 1 air link resources 206, is, e.g., a block of OFDM tone-symbols, where each OFDM tone-symbol represents one OFDM tone for the duration of one OFDM symbol transmission time interval.

Figure 3:
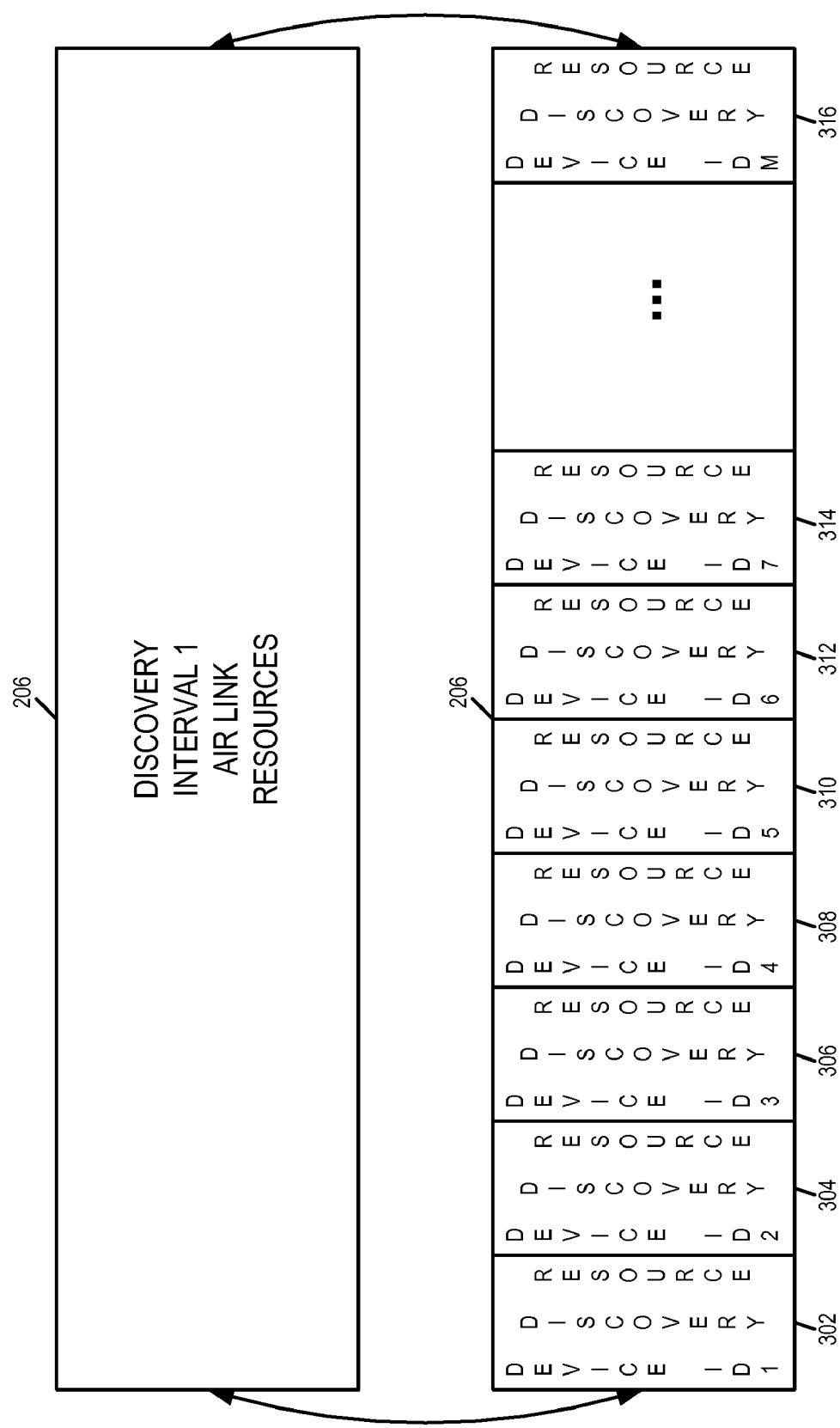
FIG. 3 illustrates a more detailed representation of a first exemplary discovery interval's air link resources.

FIG. 3 shows a more detailed representation of discovery interval 1 air link resources 206 in accordance with one exemplary embodiment. Discovery interval 1 air link resources 206 include a plurality of discovery air link resources corresponding to different device identifiers. Discovery interval 1 air link resources includes device ID 1 discovery resource 302, followed by device ID 2 discovery resource 304, followed by device ID 3 discovery resource 306, followed by device ID 4 discovery resource 308, followed by device ID 5 discovery resource 310, followed by device ID 6 discovery resource 312, followed by device ID 7 discovery resource 314, ..., and device ID M discovery resource 316.

Figure 4:
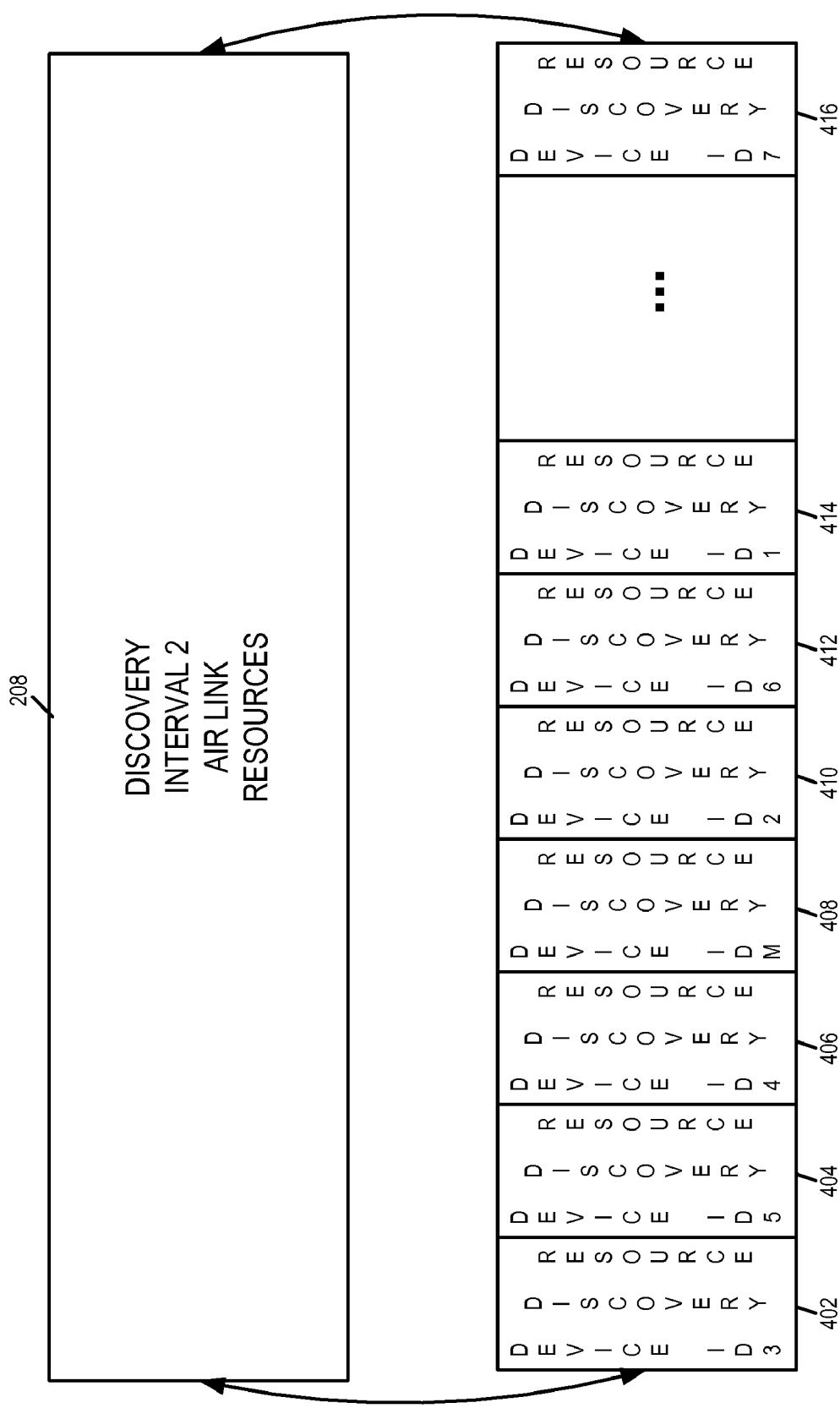
FIG. 4 illustrates a more detailed representation of a second exemplary discovery interval's air link resources.

FIG. 4 shows a more detailed representation of discovery interval 2 air link resources 208 in accordance with one exemplary embodiment. Discovery interval 2 air link resources 208 include a plurality of discovery air link resources corresponding to different device identifiers. Discovery interval 2 air link resources 208 includes device ID 3 discovery resource 402, followed by device ID 5 discovery resource 404, followed by device ID 4 discovery resource 406, followed by device ID M discovery resource 408, followed by device ID 2 discovery resource 410, followed by device ID 6 discovery resource 412, followed by device ID 1 discovery resource 414, ..., and device ID 7 discovery resource 416. It may be observed that the order of the discovery resources associated with different device identifiers has changed from discovery interval 1 206 to discovery interval 2 208 in this exemplary embodiment. The ordered change in accordance with a predetermined hopping sequence employed in the peer to peer timing/frequency structure being utilized. In some other embodiments, the relative position of air link resources associated with a particular device identifier does not change from one interval to the next.

Figure 5:
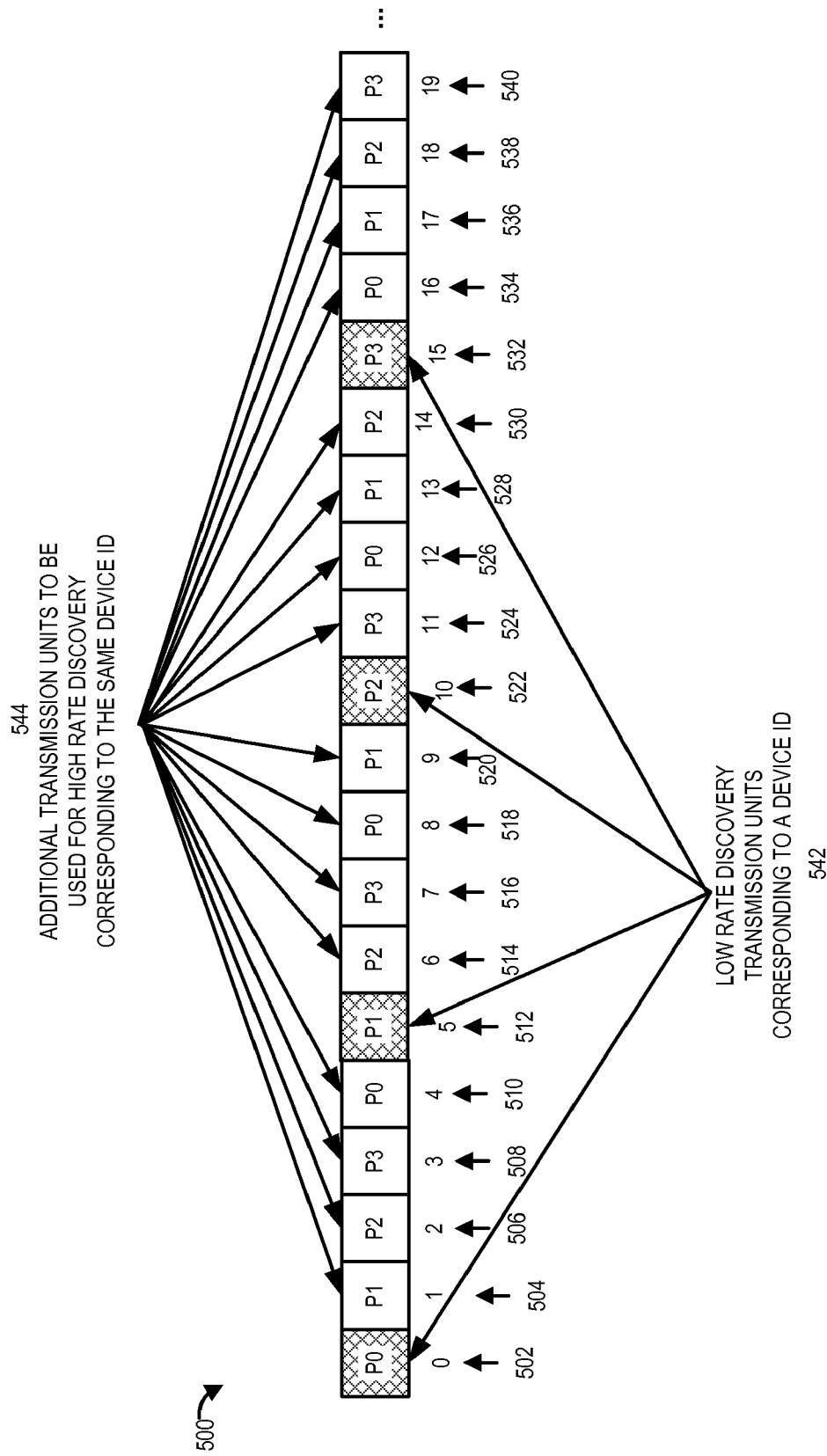
FIG. 5 illustrates a plurality of ordered transmission units available for transmitting discovery information corresponding to a device identifier which are part of a peer discovery transmission structure.

FIG. 5 is a drawing 500 illustrating a plurality of ordered transmission units available for transmitting discovery information which are part of a peer discovery transmission structure. The plurality of illustrated ordered transmission units include transmission unit 0 502, transmission unit 1 504, transmission unit 2 506, transmission unit 3 508, transmission unit 4 510, transmission unit 5 512, transmission unit 6 514, transmission unit 7 516, transmission unit 8 518, transmission unit 9 520, transmission unit 10 522, transmission unit 11 524, transmission unit 12 526, transmission unit 13 528, transmission unit 14 530, transmission unit 15 532, transmission unit 16 534, transmission unit 17 536, transmission unit 18 538 and transmission unit 19 540, which are part of a peer discovery transmission structure, and which are associated with a particular device identifier. For example, consider that the transmission units in drawing 500 of FIG. 5 belong to device ID 2. Continuing with the example, transmission unit 0 502 may be device ID 2 discovery resource 304 of discovery interval 1 air link resources 206 and transmission unit 1 504 may be device ID 2 discovery resource 410 of discovery interval 2 of air link resources 208, as illustrated in FIGS. 2, 3 and 4.

The plurality of ordered transmission units available for transmitting peer discovery information includes low rate discovery transmission units corresponding to a device identifier as indicated by grouping 542 and additional transmission units to be used for high rate discovery corresponding to the same device identifier as indicated by grouping 544. In this example, the set of low rate discovery transmission units corresponding to the device identifier 542 are illustrated with crosshatch shading and include transmission units 502, 512, 522 and 532. The set of additional transmission units to be used for high rate discovery corresponding to the device identifier are illustrated without shading and include transmission units 504, 506, 508, 510, 514, 516, 518, 520, 524, 526, 528, 530, 534, 536, 538 and 540.

Figure 6:
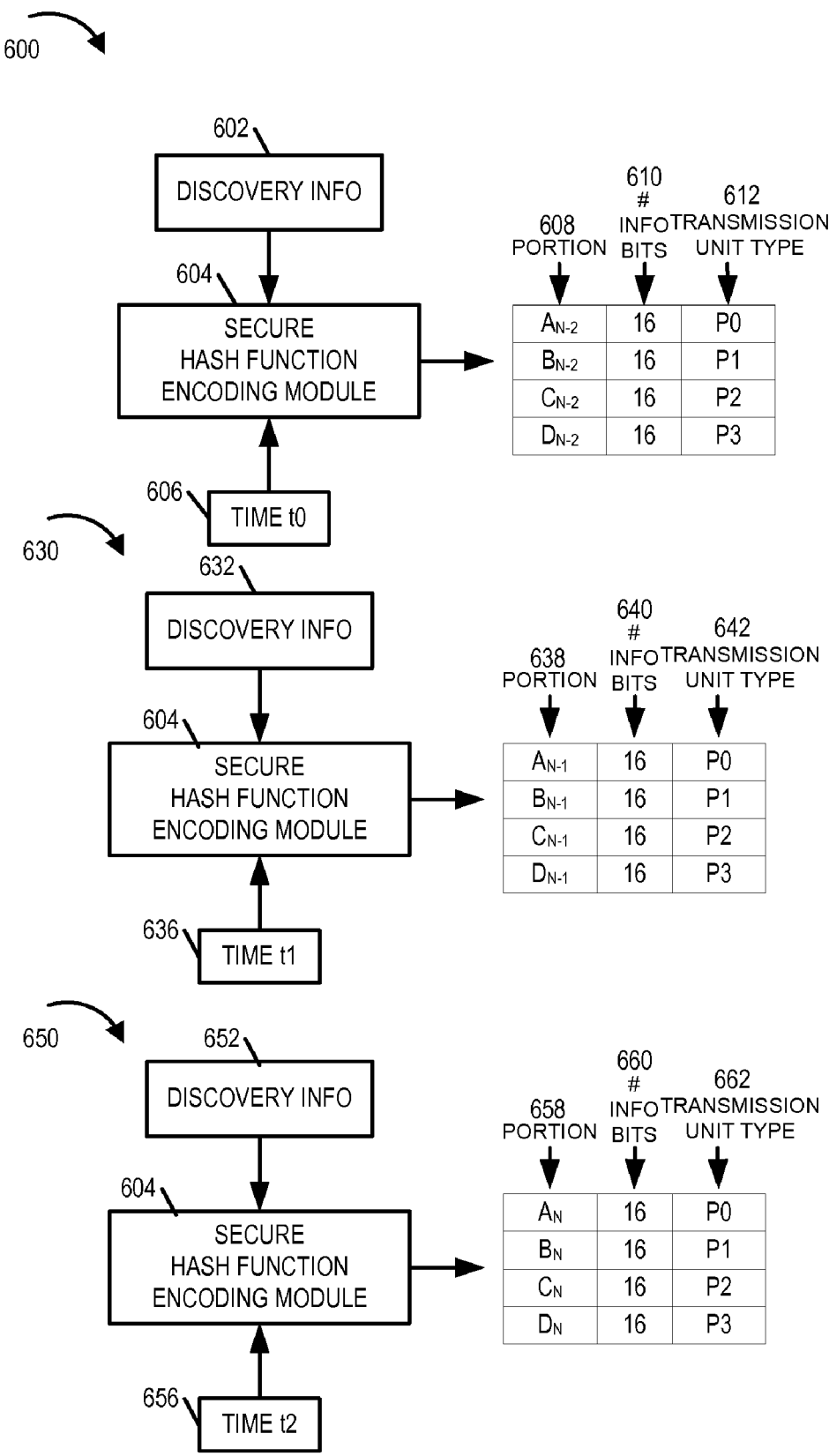
FIG. 6 illustrates a securing hash function encoding module processing input discovery information to generate encoded information.

FIG. 6 illustrates a securing hash function encoding module 604 processing input discovery information which generates encoded information. The output encoded information is mapped to portions, each portion being communicated via a transmission unit.

Drawing 600 illustrates that the secure hash function encoding module 604 receives discovery information 602 and time value t0 606 and generates a set of output information including a plurality of portions ($A_{N-2}$, $B_{N-2}$, $C_{N-2}$, $D_{N-2}$) as indicated by column 608. In this example, each portion corresponds to 16 information bits as indicated by column 610. Column 612 indicates that there is a correspondence between different encoded output portions and transmission unit types. More particularly, portion $A_{N-2}$ is to be communicated using a P0 transmission unit type in the recurring timing structure; portion $B_{N-2}$ is to be communicated using a P1 transmission unit type in the recurring timing structure; portion $C_{N-2}$, is to be communicated using a P2 transmission unit type in the recurring timing structure; and portion $D_{N-2}$, is to be communicated using a P3 transmission unit type in the recurring timing structure.

Drawing 630 illustrates that the secure hash function encoding module 604 receives discovery information 632 and time value t1 636 and generates a set of output information including a plurality of portions ($A_{N-1}$, $B_{N-1}$, $C_{N-1}$, $D_{N-1}$) as indicated by column 638. In this example, each portion corresponds to 16 information bits as indicated by column 640. Column 642 indicates that there is a correspondence between different encoded output portions and transmission unit types. More particularly, portion $A_{N-1}$ is to be communicated using a P0 transmission unit type in the recurring timing structure; portion $B_{N-1}$ is to be communicated using a P1 transmission unit type in the recurring timing structure; portion $C_{N-1}$, is to be communicated using a P2 transmission unit type in the recurring timing structure; and portion $D_{N-1}$, is to be communicated using a P3 transmission unit type in the recurring timing structure.

Drawing 650 illustrates that the secure hash function encoding module 604 receives discovery information 652 and time value t2 656 and generates a set of output information including a plurality of portions ($A_N$, $B_N$, $C_N$, $D_N$) as indicated by column 658. In this example, each portion corresponds to 16 information bits as indicated by column 660. Column 662 indicates that there is a correspondence between different encoded output portions and transmission unit types. More particularly, portion $A_N$ is to be communicated using a P0 transmission unit type in the recurring timing structure; portion $B_N$ is to be communicated using a P1 transmission unit type in the recurring timing structure; portion $C_N$, is to be communicated using a P2 transmission unit type in the recurring timing structure; and portion $D_N$ is to be communicated using a P3 transmission unit type in the recurring timing structure.

Input discovery information 602 may be the same or different from input discovery information 632. Similarly, input discovery information 632 may be the same or different from input discovery information 652. In each case, the secure hashing function encoding module 604 may, and in some instances does, include additional inputs, e.g., a key, as needed fro operation.

Figure 7:
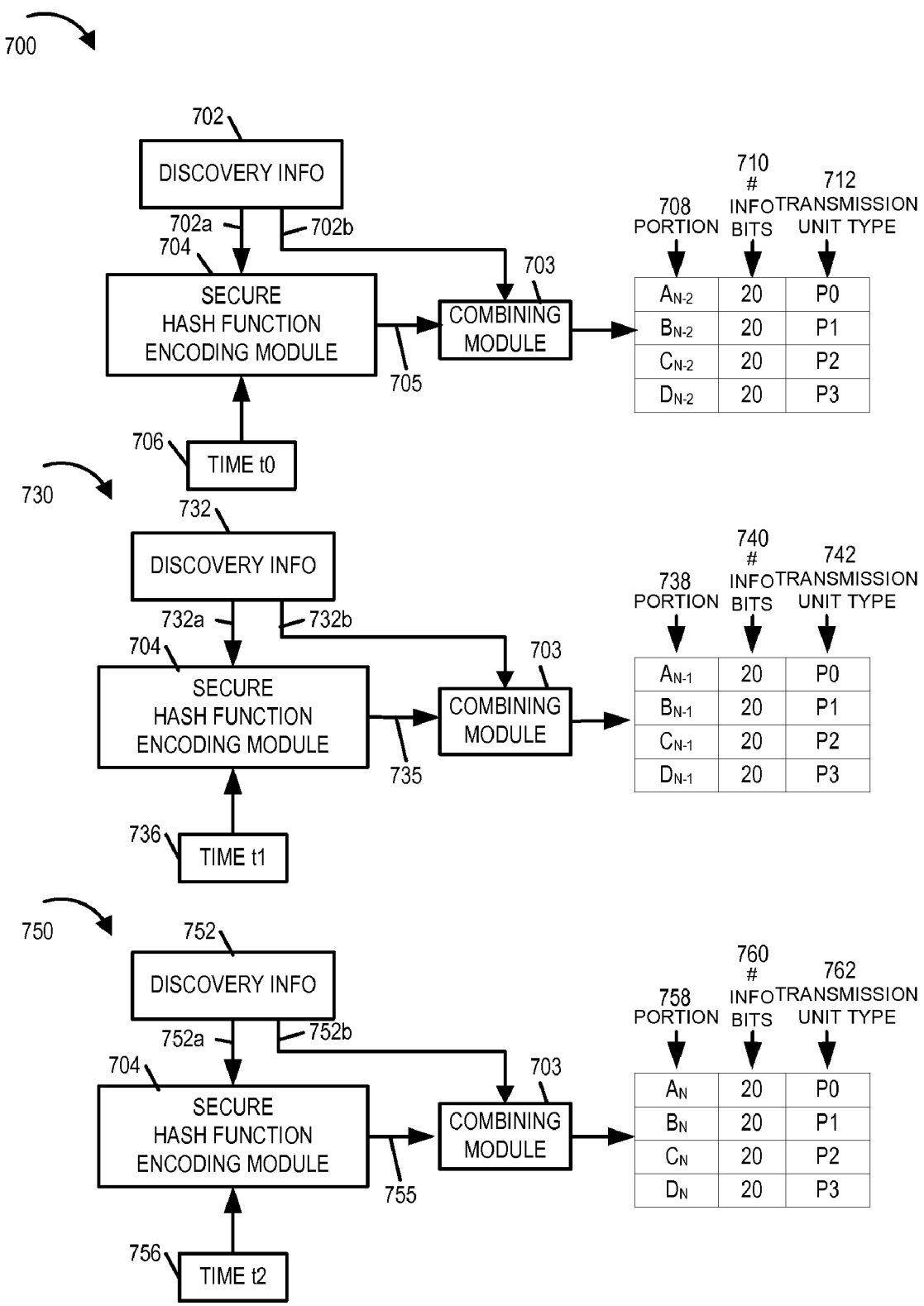
FIG. 7 illustrates a securing hash function encoding module processing some input discovery information, e.g., discovery identification information, which generates secure encoded information.

FIG. 7 illustrates a securing hash function encoding module 704 processing some input discovery information, e.g. discovery identification information, which generates secure encoded information. The output secure encoded information is combined by combining module 703 with additional discovery information, e.g., bits representing type information and/or flags. The result of the combination is mapped to portions, each portion being communicated via a transmission unit.

FIG. 7 thus illustrates a variation on the exemplary embodiment shown in FIG. 6. In the example of FIG. 7 some discovery information which is communicated is not subjected to secure hash function encoding. For example, bits representing type information and/or bits representing flags may be, and sometimes are, not subjected to secure hash function encoding. In the example of FIG. 7, discovery information (702, 732, 752) includes discovery information (702a, 732a, 752a), respectively, which is subjected to secure hash function encoding and discovery information (702b, 732b, 752b), respectively, which is not subjected to secure hash function encoding.

Drawing 700 illustrates that the secure hash function encoding module 704 receives discovery information 702a and time value t0 706 and generates secure encoded information 705. Combining module 703 receives secure encoded information 705 and discovery information 702b and generates a set of output information including a plurality of portions ($A_{N-2}$, $B_{N-2}$, $C_{N-2}$, $D_{N-2}$) as indicated by column 708. In this example, each portion corresponds to 20 information bits as indicated by column 710. Column 712 indicates that there is a correspondence between different encoded output portions and transmission unit types. More particularly, portion $A_{N-2}$ is to be communicated using a P0 transmission unit type in the recurring timing structure; portion $B_{N-2}$ is to be communicated using a P1 transmission unit type in the recurring timing structure; portion $C_{N-2}$, is to be communicated using a P2 transmission unit type in the recurring timing structure; and portion $D_{N-2}$, is to be communicated using a P3 transmission unit type in the recurring timing structure.

Drawing 730 illustrates that the secure hash function encoding module 704 receives discovery information 732a and time value t1 736 and generates secure encoded information 735. Combining module 703 receives secure encoded information 735 and discovery information 732b and generates a set of output information including a plurality of portions ($A_{N-1}$, $B_{N-1}$, $C_{N-1}$, $D_{N-1}$) as indicated by column 738. In this example, each portion corresponds to 20 information bits as indicated by column 740. Column 742 indicates that there is a correspondence between different encoded output portions and transmission unit types. More particularly, portion $A_{N-1}$ is to be communicated using a P0 transmission unit type in the recurring timing structure; portion $B_{N-1}$ is to be communicated using a P1 transmission unit type in the recurring timing structure; portion $C_{N-1}$, is to be communicated using a P2 transmission unit type in the recurring timing structure; and portion $D_{N-1}$, is to be communicated using a P3 transmission unit type in the recurring timing structure.

Drawing 750 illustrates that the secure hash function encoding module 704 receives discovery information 752a and time value t2 756 and generates secure encoded information 755. Combining module 703 receives secure encoded information 755 and discovery information 752b and generates a set of output information including a plurality of portions ($A_N$, $B_N$, $C_N$, $D_N$) as indicated by column 758. In this example, each portion corresponds to 20 information bits as indicated by column 760. Column 762 indicates that there is a correspondence between different encoded output portions and transmission unit types. More particularly, portion $A_N$ is to be communicated using a P0 transmission unit type in the recurring timing structure; portion $B_N$ is to be communicated using a P1 transmission unit type in the recurring timing structure; portion $C_N$, is to be communicated using a P2 transmission unit type in the recurring timing structure; and portion $D_N$, is to be communicated using a P3 transmission unit type in the recurring timing structure.

Input discovery information 702 may be the same or different from input discovery information 732. Similarly, input discovery information 732 may be the same or different from input discovery information 752. In each case, the secure hashing function encoding module 704 may, and in some instances does, include additional inputs, e.g., a key as needed for operation.

FIG. 8 illustrates 3 exemplary formats for discovery information being conveyed using four output portions. Drawing 800 illustrates a first exemplary format in which output discovery identification information 802 to be transmitted includes 64 bits as indicated by block 804 and includes 4 portions (portion A 806, portion B 808, portion C 810, and portion D 812. This format is an exemplary format corresponding to the examples of FIG. 6. For example, the four output portions (portion A 806, portion B 808, portion C 810, portion D 812) of drawing 800 of FIG. 8 are the set of {$A_{n-2}$, $B_{n-2}$, $C_{n-2}$ and $D_{n-2}$}, or the set of four output portions are {$A_{n-1}$, $B_{n-1}$, $C_{n-1}$ and $D_{n-1}$}, or the set {$A_n$, $B_n$, $C_n$ and $D_n$} of FIG. 6.

Drawing 820 illustrates a second exemplary format in which output discovery identification information 834 to be transmitted includes 80 bits and includes 4 output portions (portion A 834, portion B 836, portion C 838, and portion D 840). This format is an exemplary format corresponding to the examples of FIG. 7. For example, the four output portions (portion A 834, portion B 836, portion C 840, portion D 842) of drawing 820 of FIG. 8 are the set of {$A_{n-2}$, $B_{n-2}$, $C_{n-2}$ and $D_{n-2}$}, or the set of four output portions are {$A_{n-1}$, $B_{n-1}$, $C_{n-1}$ and $D_{n-1}$}, or the set {$A_n$, $B_n$, $C_n$ and $D_n$} of FIG. 7. In example of drawing 820, the output discovery information to be communicated includes a type field 822 which is 8 bits wide as indicated by 828 and a flags field 824 which is 8 bits wide as indicated by block 830 and a discovery identification information field 826 which is 64 bits wide as indicated by block 832. In the example of drawing 820 the type field 822 and the flags field 824 are included as part of portion A 834, while the discovery identification information 826 is communicated using bits in portion A 834, portion B 836, portion C 838 and portion D 840.

Drawing 850 illustrates a third exemplary format in which output discovery identification information 834 to be transmitted includes 80 bits and includes 4 output portions (portion A 893, portion B 895, portion C 897, and portion D 899). This format is an exemplary format corresponding to the examples of FIG. 7. For example, the four output portions (portion A 893, portion B 895, portion C 897, portion D 899) of drawing 850 of FIG. 8 are the set of $\{A_{n-2}, B_{n-2}, C_{n-2}$ and $D_{n-2}\}$, or the set of four output portions are $\{A_{n-1}, B_{n-1}, C_{n-1}$ and $D_{n-1}\}$, or the set $\{A_n, B_n, C_n$ and $D_n\}$ of FIG. 7. In the example of drawing 850, the discovery information to be communicated in portion A 893 includes a type field 852 which is 2 bits wide as indicated by block 876, a flags field 854 which is 2 bits wide as indicated by block 878 and a discovery identification information field 856 which is 16 bits wide as indicated by block 880. The discovery information to be communicated in portion B 895 includes a type field 858 which is 2 bits wide as indicated by block 882, a flags field 860 which is 2 bits wide as indicated by block 884 and a discovery identification information field 862 which is 16 bits wide as indicated by block 886. The discovery information to be communicated in portion C 897 includes a type field 864 which is 2 bits wide as indicated by block 888, a flags field 866 which is 2 bits wide as indicated by block 890 and a discovery identification information field 868 which is 16 bits wide as indicated by block 892. The discovery information to be communicated in portion D 899 includes a type field 870 which is 2 bits wide as indicated by 894, a flags field 872 which is 2 bits wide as indicated by block 896 and a discovery identification information field 874 which is 16 bits wide as indicated by block 898.

Type information conveyed in a type field includes, e.g., information indicating a format of other discovery information being conveyed, e.g., other upper layer discovery information. For example, a type value conveyed in the type field is used to identify how to process the discovery information being conveyed, e.g., different type values map to different formats which can be used and/or different encoding which can be used and/or different encryptions which can be used. Type field information can be, and sometimes is, used to convey what the contents of processed, e.g., hashed, discovery information represents.

Flags are used to indicate one or more binary conditions, e.g., capabilities or features. In some embodiments, flags are used to identify a device type, e.g., a router. In some embodiments, a portion of the discovery information to be conveyed is included in every transmission portion. In some embodiments, a portion of the discovery information to be conveyed is split over a set of associated peer discovery transmission portions. Some portions of discovery information, e.g. a subset of flags may be sufficiently time critical to include in every transmission portion. In some embodiments, to be able to interpret some discovery information being communicated, a receiving device needs to have already received a type value; thus in such an embodiment, the frequency at which Type is conveyed can, and sometimes does, impact the ability to react to partial sets of discovery information. In some such embodiments, a type field is included in each discovery transmission portion to facilitate rapid recovery of discovery information being conveyed in a received transmitted portion.

Other embodiments, may include other fields in addition to or in place of those described with respect to FIG. 8, e.g., a header field, a CRC field, etc.

Figure 9:
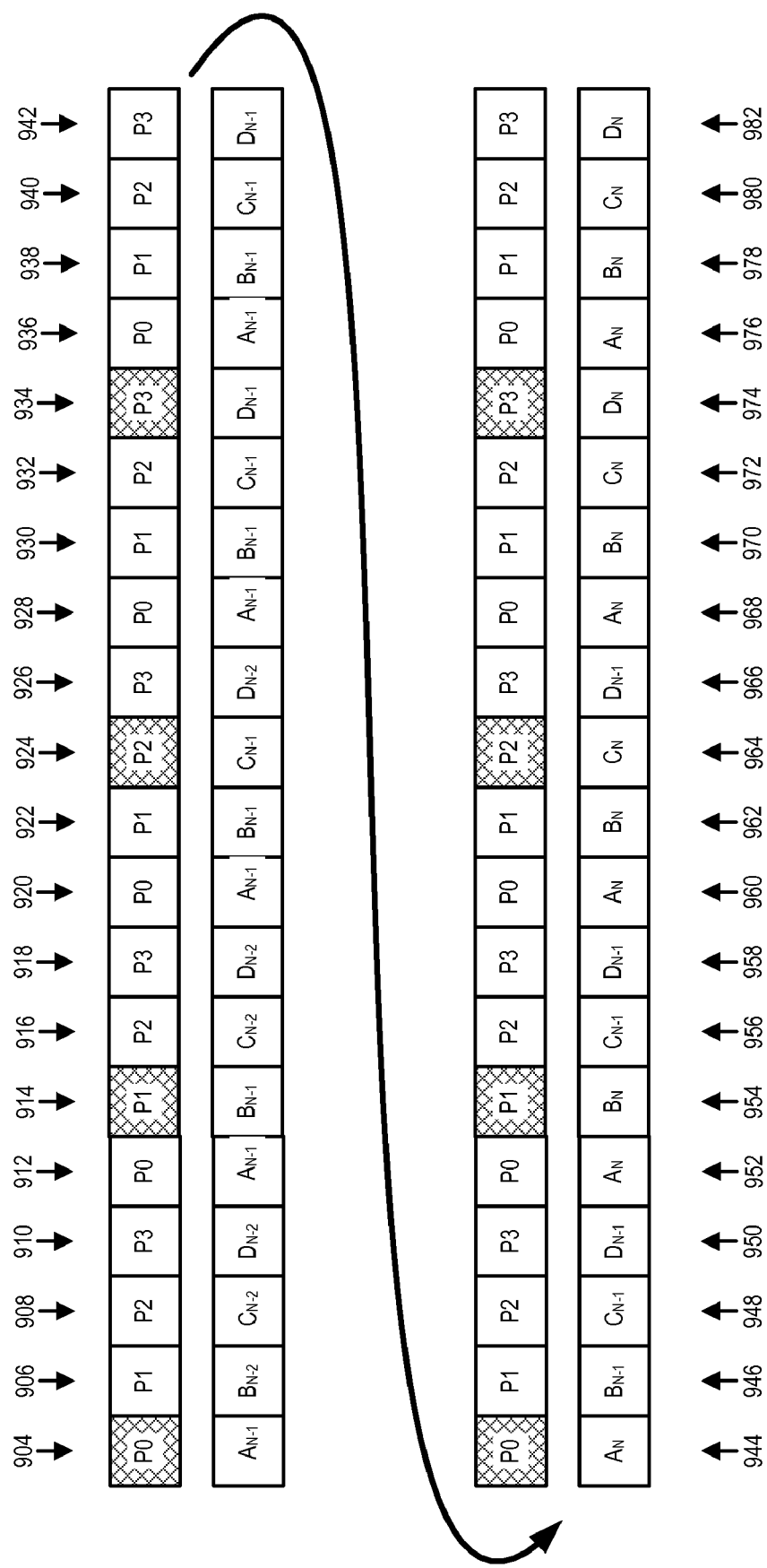
FIG. 9 illustrates mapping of generated portions to ordered transmission units for conveying discovery information associated with a device identifier in accordance with one exemplary embodiment.

FIG. 9 illustrates mapping of the generated portions of FIG. 6 or FIG. 7 to ordered transmission units for conveying discovery information associated with a wireless communications device identifier in accordance with one exemplary embodiment using a particular mapping pattern. An ordered sequence of transmission units (904, 906, 908, 910, 912, 914, 916, 918, 920, 922, 924, 926, 928, 930, 932, 934, 936, 938, 940, 942, 944, 946, 948, 950, 952, 954, 956, 958, 960, 962, 964, 966, 968, 970, 972, 974, 976, 978, 980, 982) which are of the type (P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3), respectively, and which convey information ($A_{N-1}$, $B_{N-2}$, $C_{N-2}$, $D_{N-2}$, $A_{N-1}$, $B_{N-1}$, $C_{N-2}$, $D_{N-2}$, $A_{N-1}$, $B_{N-1}$, $C_{N-1}$, $D_{N-2}$, $A_{N-1}$, $B_{N-1}$, $C_{N-1}$, $D_{N-1}$, $A_{N-1}$, $B_{N-1}$, $C_{N-1}$, $D_{N-1}$, $A_N$, $B_{N-1}$, $C_{N-1}$, $D_{N-1}$, $A_N$, $B_N$, $C_{N-1}$, $D_{N-1}$, $A_N$, $B_N$, $C_N$, $D_{N-1}$, $A_N$, $B_N$, $C_N$, $D_N$, $A_N$, $B_N$, $C_N$, $D_N$), respectively. It may be observed that transmission units (904, 914, 924, 934, 944, 954, 964, and 974) are low rate discovery transmission units as indicated by crosshatch shading, while transmission units (906, 908, 910, 912, 916, 918, 920, 922, 926, 928, 930, 932, 936, 938, 940, 942, 946, 948, 950, 952, 956, 958, 960, 962, 966, 968, 970, 972, 976, 978, 980 and 982) are additional transmission units to be used for high rate discovery. It should be noted, that an additional transmission unit for high rate discovery of a given type is designated to carry the information portion that has been previously transmitted via a low rate discovery transmission unit of the same type, when it carries a transmission unit.

If a first peer to peer communications device having the identifier corresponding to the set of transmission units is in high rate discovery information transmit mode, it transmits using each of the transmission units. However, if first the peer to peer communications device is in low rate discovery transmit mode it transmits using the low rate discovery resources, but refrains from transmitting on the additional transmission resources designated for high rate discovery. The structure of FIG. 9 illustrates the dissemination of the same portions of discovery information from a first peer to peer communications irrespective of the transmit mode, but facilitates a more rapid potential recovery of the information by a second peer to peer device if high rate mode is used. In addition, this illustrated structure of FIG. 9 advantageously facilitates a peer discovery assist node or base station being able to: (i) receive and detect discovery signals being communicated from a first peer to peer communications device transmitting discovery signals using low discovery rate transmission units but not additional transmission units designated for high discovery rate, and (ii) then broadcast such received information using the additional transmission units designated for high rate discovery, e.g., filling in the otherwise unused additional transmission units designated for high rate discovery. A second peer to peer communications device attempting to detect peer discovery information from the first peer discovery device can receive and process discovery transmission units which occur on each of the transmission units associated with the device identifier. The second peer to peer communications device need not know the transmission source of a particular additional transmission unit signal, e.g., the first communications device or the assist node.

Figure 10:
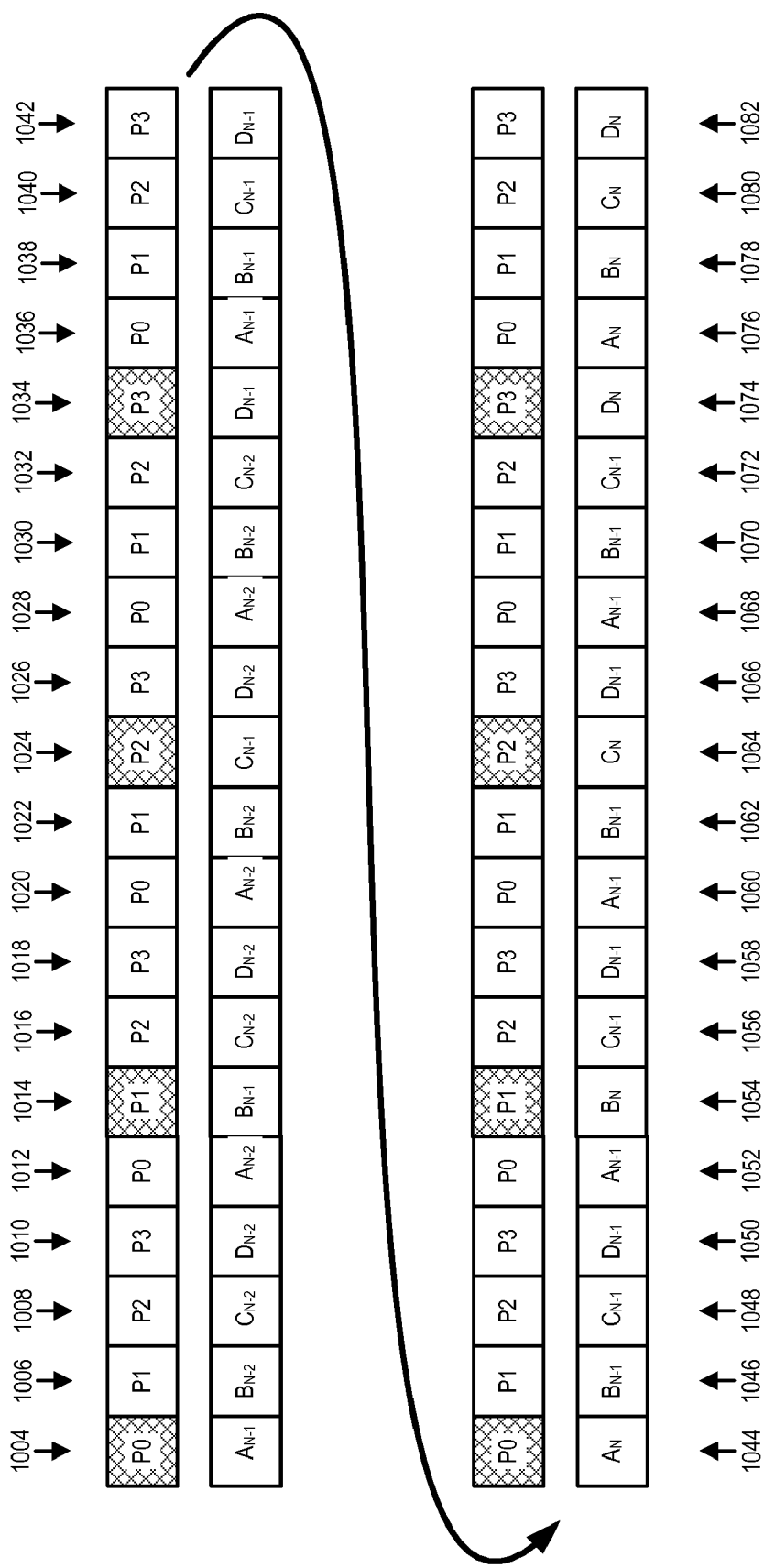
FIG. 10 illustrates mapping of generated portions to ordered transmission units for conveying discovery information associated with a device identifier in accordance with another exemplary embodiment.

FIG. 10 illustrates mapping of the generated portions of FIG. 6 or FIG. 7 to ordered transmission units for conveying discovery information associated with a wireless communications device identifier in accordance with another exemplary embodiment. An ordered sequence of transmission units (1004, 1006, 1008, 1010, 1012, 1014, 1016, 1018, 1020, 1022, 1024, 1026, 1028, 1030, 1032, 1034, 1036, 1038, 1040, 1042, 1044, 1046, 1048, 1050, 1052, 1054, 1056, 1058, 1060, 1062, 1064, 1066, 1068, 1070, 1072, 1074, 1076, 1078, 1080, 1082) which are of the type (P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3, P0, P1, P2, P3), respectively, and which convey information ($A_{N-1}$, $B_{N-2}$, $C_{N-2}$, $D_{N-2}$, $A_{N-2}$, $B_{N-1}$, $C_{N-2}$, $D_{N-2}$, $A_{N-2}$, $B_{N-2}$, $C_{N-1}$, $D_{N-2}$, $A_{N-2}, B_{N-2}, C_{N-2}, D_{N-1}, A_{N-1}, B_{N-1}, C_{N-1}, D_{N-1}, A_N, B_{N-1}, C_{N-1}, D_{N-1}, A_{N-1}, B_N, C_{N-1}, D_{N-1}, A_{N-1}, B_{N-1}, C_N, D_{N-1}, A_{N-1}, B_{N-1}, C_{N-1}, D_N, A_N, B_N, C_N, D_N$), respectively. It may be observed that transmission units (1004, 1014, 1024, 1034, 1044, 1054, 1064, and 1074) are low rate discovery transmission units as indicated by crosshatch shading, while transmission units (1006, 1008, 1010, 1012, 1016, 1018, 1020, 1022, 1026, 1028, 1030, 1032, 1036, 1038, 1040, 1042, 1046, 1048, 1050, 1052, 1056, 1058, 1060, 1062, 1066, 1068, 1070, 1072, 1076, 1078, 1080 and 1082) are additional transmission units to be used for high rate discovery. It should be noted, that an additional transmission unit for high rate discovery is designated to carry an information portion that has been previously transmitted via a low rate discovery transmission unit, when it carries a transmission unit. In this example, the information carried on the additional resources associated with high rate discovery does not change until a complete set of low rate discovery information has been transmitted.

Figure 11:
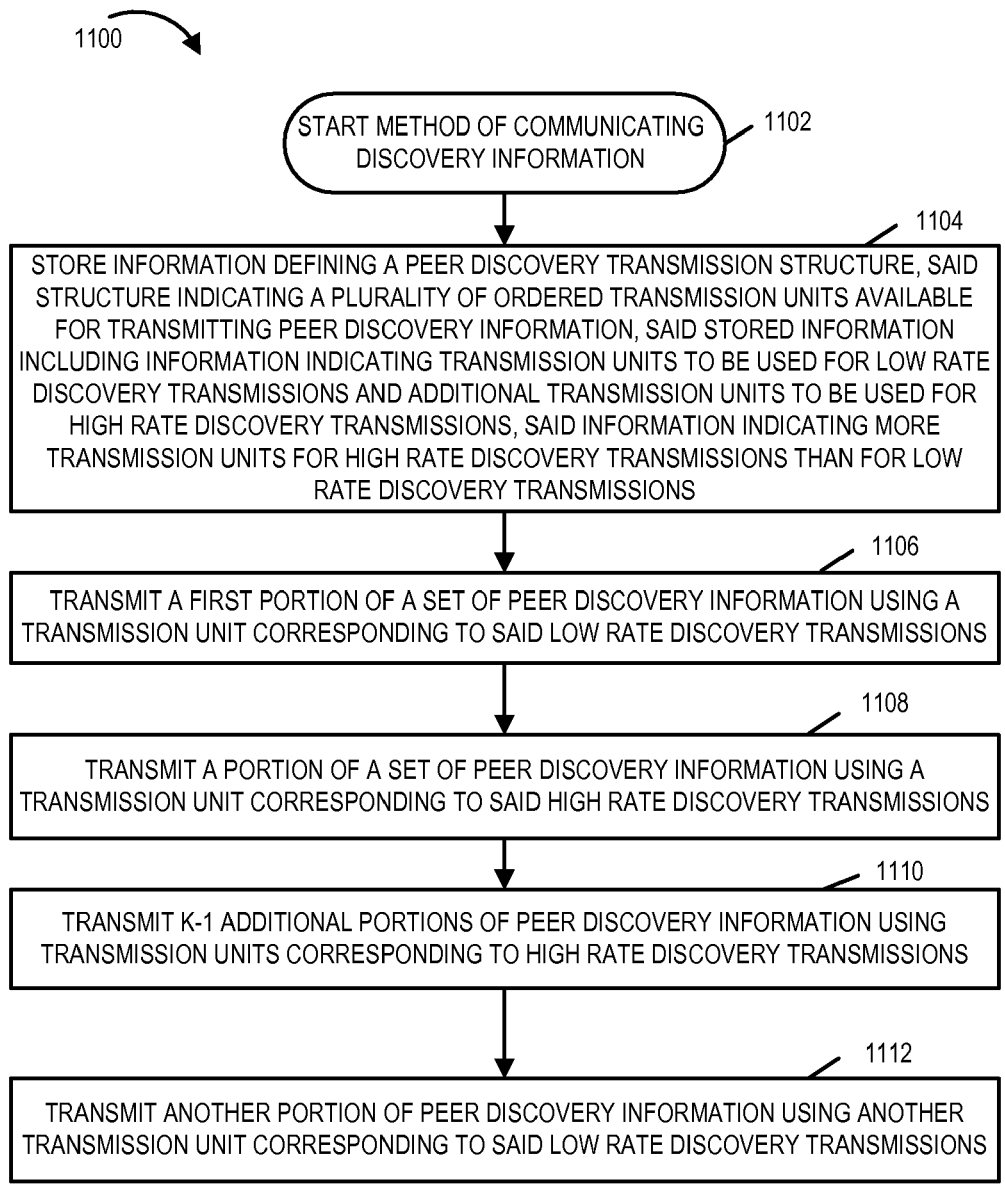
FIG. 11 is a flowchart of an exemplary method of operating a communications device, e.g., a wireless terminal, to communicate discovery information.

FIG. 11 is a flowchart 1100 of an exemplary method of operating a communications device, e.g. a wireless terminal, to communicate discovery information, e.g., to broadcast peer discovery information. Operation starts in step 1102 and proceeds to step 1104. In step 1104, the communications device stores information defining a peer discovery transmission structure, said structure indicating a plurality of ordered transmission units available for transmitting peer discovery information, said stored information including information indicating transmission units to be used for low rate discovery transmissions and additional transmission units to be used for high rate discovery transmissions, said information indicating more transmission units for high rate discovery transmissions than for low rate discovery transmissions. For example, in some exemplary embodiments, there are 4 additional transmission units for each low rate discovery transmission unit in the peer discovery transmission structure. See FIG. 5. Other peer discovery structures may have different ratios between the number of additional transmission units associated with high rate discovery and the number of number of transmission units associated with low rate discovery. Operation proceeds from step 1104 to step 1106.

In step 1106, the communications device transmits a first portion of a set of peer discovery information using a transmission unit corresponding to said low rate discovery transmissions. In some embodiments, the set of peer discovery information including the first portion includes a total of K portions, where K is a positive integer greater than or equal to 2. In some examples there are 4 portions in a set of peer discovery information. For example one set of 4 is the set {portion $A_N$, portion $B_N$, portion $C_N$, portion $D_N$}. Operation proceeds from step 1106 to step 1108.

In step 1108, the communications device transmits portion of a set of peer discovery information using a transmission unit corresponding to said high rate discovery transmissions. In some embodiments, the transmitted portion of step 1108 is a previously transmitted portion. The repeating of previously portions has benefits relating to security in combination with proxying. In some embodiments, the transmitted portion of step 1108 is not a previously transmitted portion. Operation proceeds from step 1108 to step 1110.

In step 1110 the communications device transmits K−1 additional portions of peer discovery information using transmission units corresponding to high rate discovery transmissions. Operation proceeds from step 1110 to step 1112.

Then, in step 1112, the communications device transmits another portion of peer discovery information using another transmission unit corresponding to said low rate discovery transmissions.

A first example in accordance with the method of flowchart 1100 will now be described. In a first example, consider FIG. 9, and assume that the communications device stores peer discovery transmission structure information in accordance with the pattern of FIG. 9 (step 1104). Also assume that the communications device is in a high rate discovery transmit mode and is transmitting using each of the illustrated discovery transmission units indicated in FIG. 9. The first portion transmitted in step 1106 is, e.g., portion $A_N$ in the set of {$A_N$, $B_N$, $C_N$, $D_N$} and is transmitted using the low rate discovery transmission resource indicated by arrow 944. In this example assume that a set of discovery information has K portions, where K=4. The previously transmitted portion transmitted in step 1108 is, e.g., portion $B_{N-1}$, which belongs to the set of {$A_{N-1}$, $B_{N-1}$, $C_{N-1}$, $D_{N-1}$} and is transmitted using the high rate discovery transmission resource indicated by arrow 946. In this example, the previously transmitted portion of step 1108 corresponds to different set of peer discovery information than the set which includes the first portion of step 1106. Continuing with the example, the K−1 additional portions transmitted in step 1110 are, e.g., the three portions $C_{N-1}$, $D_{N-1}$, $A_N$ transmitted using transmission units corresponding to high rate discovery transmissions as indicated by arrows 948, 950, and 952. Continuing with the example, the another portion transmitted in step 1112 is, e.g., portion $B_N$ which is transmitted using another transmission unit corresponding to low rate discovery transmissions as indicated by arrow 954.

A second example in accordance with the method of flowchart 1100 will now be described. In the second example, consider FIG. 9, and assume that the communications device stores peer discovery transmission structure information in accordance with the pattern of FIG. 9 (step 1104). Also assume that the communications device is in a high rate discovery transmit mode and is transmitting using each of the illustrated discovery transmission units indicated in FIG. 9. The first portion transmitted in step 1106 is, e.g., portion $D_{N-1}$ in the set of {$A_{N-1}$, $B_{N-1}$, $C_{N-1}$, $D_{N-1}$} and is transmitted using the low rate discovery transmission resource indicated by arrow 934. In this example assume that a set of discovery information has K portions, where K=4. The previously transmitted portion transmitted in step 1108 is, e.g., portion $A_{N-1}$, which belongs to the set of {$A_{N-1}$, $B_{N-1}$, $C_{N-1}$, $D_{N-1}$} and is transmitted using the high rate discovery transmission resource indicated by arrow 936. In this example, the previously transmitted portion of step 1108 corresponds to the same set of peer discovery information as the set which includes the first portion of step 1106. Continuing with the example, the K−1 additional portions transmitted in step 1110 are, e.g., the three portions $B_{N-1}$, $C_{N-1}$, $D_{N-1}$ transmitted using transmission units corresponding to high rate discovery transmissions as indicated by arrows 938, 940, and 942. In this example, the first portion, the previously transmitted portion and the K−1 additional portions are all from the same set of peer discovery information. Continuing with the example, the another portion transmitted in step 1112 is, e.g., portion $A_N$ which is transmitted using another transmission unit corresponding to low rate discovery transmissions as indicated by arrow 944.

A third example in accordance with the method of flowchart 1100 will now be described. In the third example, consider FIG. 10, and assume that the communications device stores peer discovery transmission structure information in accordance with the pattern of FIG. 10 (step 1104). Also assume that the communications device is in a high rate discovery transmit mode and is transmitting using each of the illustrated discovery transmission units indicated in FIG. 10.

The first portion transmitted in step 1106 is, e.g., portion $A_N$ in the set of $\{A_N, B_N, C_N, D_N\}$ and is transmitted using the low rate discovery transmission resource indicated by arrow 1044. In this example assume that a set of discovery information has K portions, where K=4. The previously transmitted portion transmitted in step 1108 is, e.g., portion $B_{N-1}$, which belongs to the set of $\{A_{N-1}, B_{N-1}, C_{N-1}, D_{N-1}\}$ and is transmitted using the high rate discovery transmission resource indicated by arrow 1046. In this example, the previously transmitted portion of step 1108 corresponds to a different set of peer discovery information as the set which includes the first portion of step 1106. Continuing with the example, the K−1 additional portions transmitted in step 1110 are, e.g., the three portions $C_{N-1}, D_{N-1}, A_{N-1}$ transmitted using transmission units corresponding to high rate discovery transmissions as indicated by arrows 1048, 1050, and 1052. In this example, the previously transmitted portion and the K−1 additional portions are all from the same set of peer discovery information. In addition, said previously transmitted portion and said N−1 additional portions are transmitted consecutively using transmission units corresponding to high rate peer discovery transmissions following transmission of said first portion. Continuing with the example, the another portion transmitted in step 1112 is, e.g., portion $B_N$ which is transmitted using another transmission unit corresponding to low rate discovery transmissions as indicated by arrow 1054.

A fourth example in accordance with the flowchart 1100 of FIG. 11 will now be described. Multiple peer discovery related advertisements are sent with some being communicated at a low rate using low rate peer discovery transmissions and some being sent at a high rate using high rate peer discovery transmission. For example, a first peer discovery related advertisement is communicated at a low rate using the transmission of steps 1106 and 1112, while a second peer discovery related advertisement is communicated using the transmissions of steps 1108 and 1110.

Figure 12A:
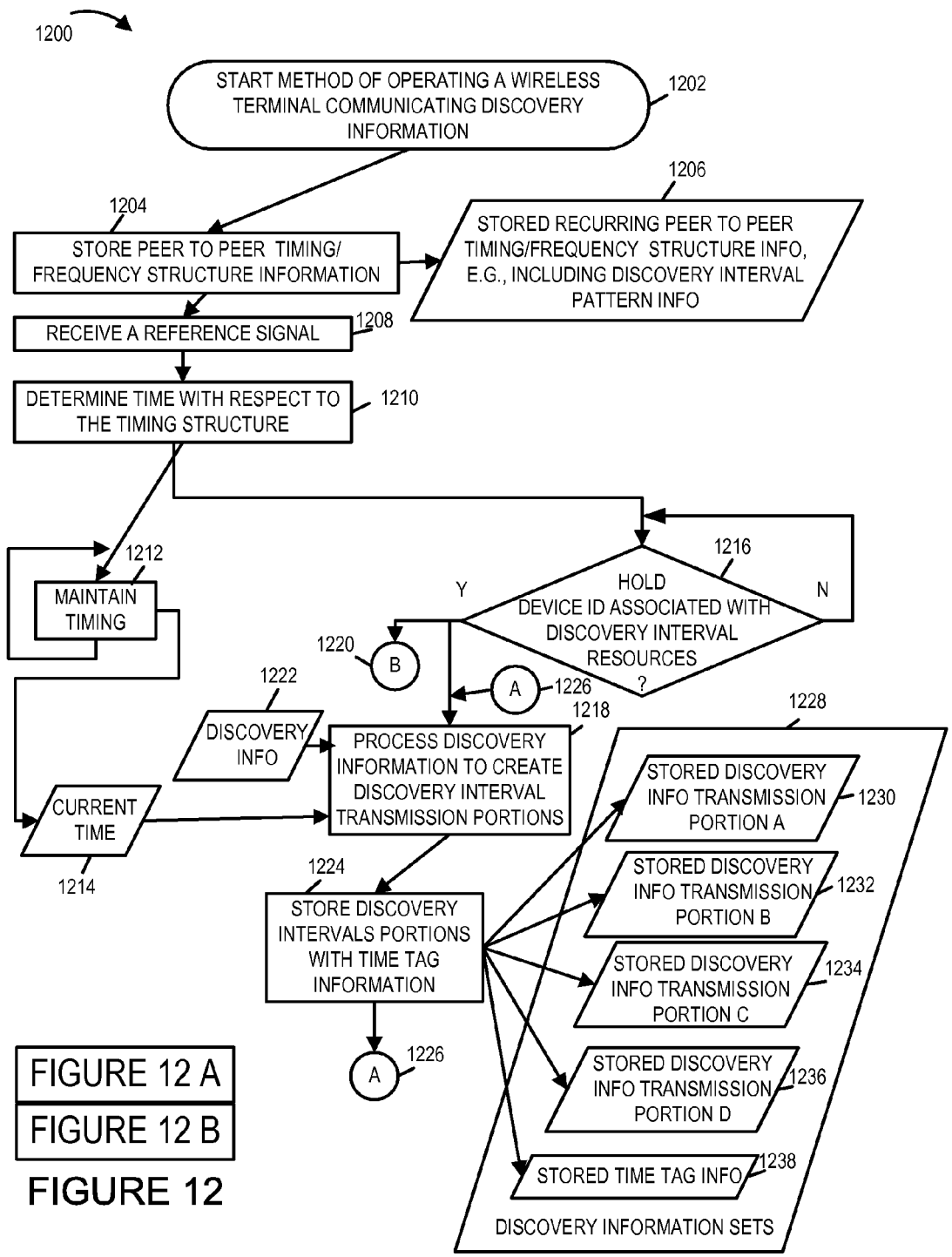
FIG. 12, comprising the combination of FIG. 12A and FIG. 12B, is a flowchart of an exemplary method of operating a wireless terminal, e.g., a mobile node supporting peer to peer communications, to communicate discovery information, in accordance with an exemplary embodiment.
Figure 12B:
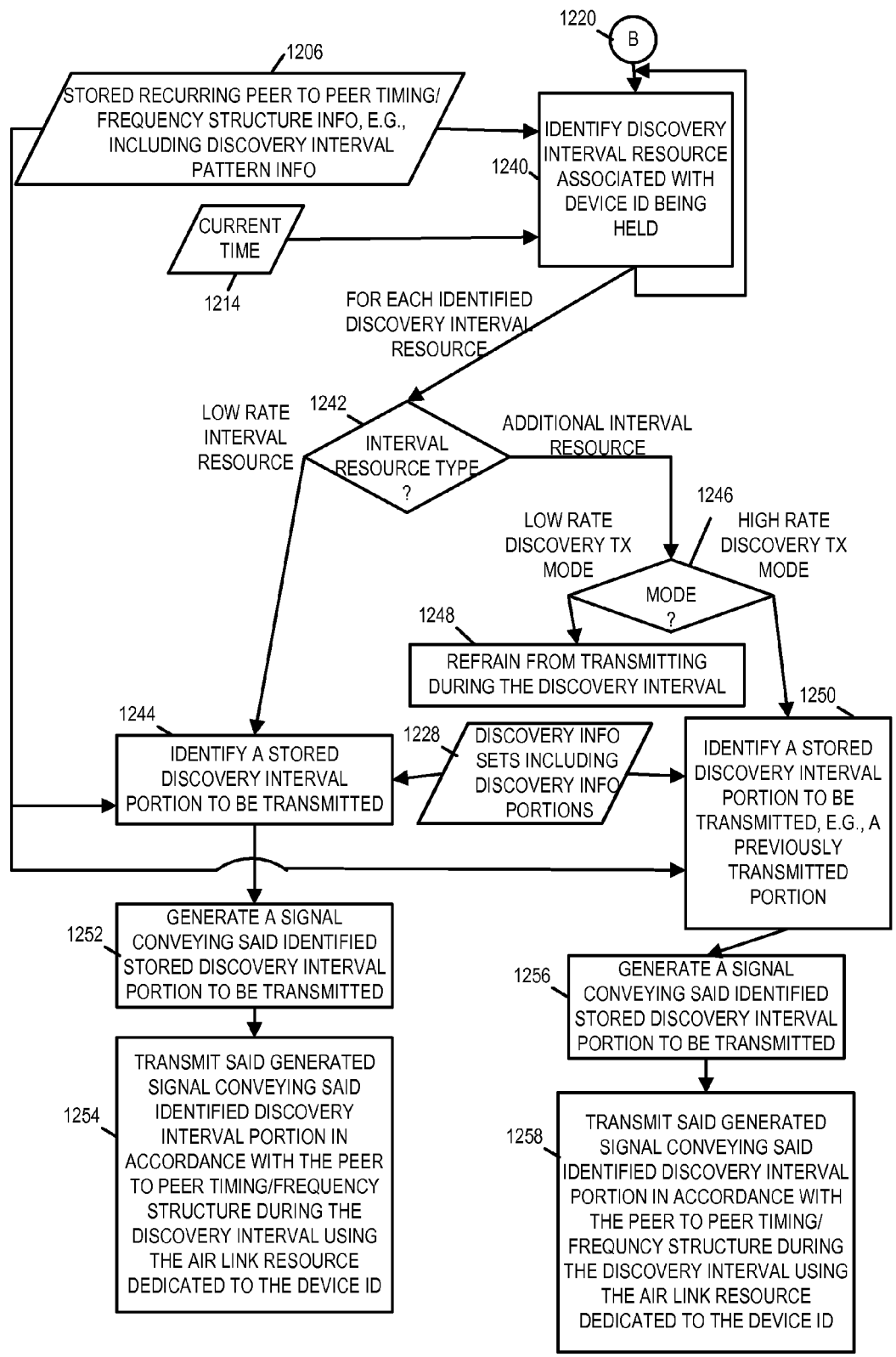

FIG. 12, comprising the combination of FIG. 12A and FIG. 12B, is a flowchart 1200 of an exemplary method of operating a wireless terminal, e.g., a mobile node supporting peer to peer communications, to communicate discovery information, in accordance with an exemplary embodiment. The wireless terminal is, e.g., one of the peer to peer communications devices (102, 104, 106, 108, 110) of system 100 of FIG. 1.

The exemplary method of flowchart 1200 starts in step 1202 and proceeds to step 1204, in which the wireless terminal stores peer to peer timing/frequency structure information as stored recurring peer to peer timing/frequency structure information 1206. The storing of step 1204 is, e.g., part of a wireless terminal configuration and/or wireless terminal initialization process. The stored peer to peer timing/frequency structure information 1206 includes, e.g., information identifying a plurality of discovery interval air link resources, information associating particular discovery interval air link resources with particular device identifiers and information indicating a discovery interval pattern. The stored recurring peer to peer timing/frequency structure information 1206 defines a peer discovery transmission structure, which includes a plurality of ordered transmission units available for transmitting peer discovery information. Information 1206 includes information indicating transmission units to be used for low rate discovery transmissions and additional transmission units to be used for high rate discovery transmissions, and indicates that more transmission units for high rate discovery transmissions than for low rate discovery transmissions. Information described in FIGS. 2, 3, 4, 5, 9 and/or 10 includes information that may be included as part of stored recurring peer to peer timing/frequency structure information.

Operation proceeds from step 1204 to step 1208, in which the wireless terminal receives a reference signal. For example, the wireless receives a beacon signal, e.g., an OFDM beacon signal, from beacon transmitter 116 of FIG. 1, wherein the beacon signal is used to coordinate timing with respect to a peer to peer timing structure being used in system 100. Operation proceeds from step 1208 to step 1210. In step 1210, the wireless terminal determines time with respect to the timing structure based on the received signal of step 1208. Operation proceeds from step 1210 to steps 1212 and 1216.

In step 1212, which is performed on an ongoing basis, the wireless terminal maintains timing and outputs current time 1214, which is utilized in other steps. Returning to step 1216, in step 1216 the wireless terminal checks and determines whether it holds a device ID associated with discovery interval air link resources. If it does not currently hold a device ID associated with discovery interval air link resources, then operation returns to the input of step 1216, for another check at a later point in time. However, if the wireless terminal does hold a device ID associated with discovery interval resources, then operation proceeds from step 1216 to step 1218 and step 1240, via connecting node B 1220.

Returning to step 1218, in step 1218 the wireless terminal processes discovery information 1222, using current time information 1214, to create discovery interval transmission portions. FIGS. 6 and 7 illustrate exemplary processing of discovery information and the generation of discovery interval transmission portions. Operation proceeds from step 1218 to step 1224, in which the wireless terminal stores discovery interval portions with time tag information as part of stored discovery information sets information 1228. An example of the output from step 1224 is presented for one set of information which includes stored discovery information transmission portion A 1230, stored discovery information transmission portion B 1232, stored discovery information portion C 1234, stored discovery information portion D 1236, and stored time tag information 1238. In other embodiments, a different number of portions may correspond to a set of discovery information. In some embodiments, time tag information is not stored directly with a set of discovery information, but rather indirectly, e.g., with a set of discovery information being stored in a set of memory locations which the wireless terminal associates with an index value, e.g., set N−2, set N−1, set N.

Returning to step 1240, in step 1240, which is performed on a recurring basis, the wireless terminal identifies, using stored recurring peer to peer timing/frequency structure information 1206 and current time information 1214, a discovery interval resource associated with the device ID currently being held by the wireless terminal. For each identified discovery interval resource associated with the device identifier being currently held by the wireless terminal, operation proceeds from step 1240 to step 1242. In step 1242, the wireless terminal determines the interval resource type of the identified discovery interval resource. If the identified interval resource is determined to be a low rate interval resource, then operation proceeds from step 1242 to step 1244. However, if the wireless terminal determines that the identified interval resource is an additional interval resource, then operation proceeds from step 1242 to step 1246.

Returning to step 1244, in step 1244 the wireless terminal identifies a stored discovery interval portion to be transmitted. Inputs to step 1244 include stored recurring peer to peer timing/frequency structure information 1206 and discovery information sets including discovery information portions 1228. Operation proceeds from step 1244 to step 1252. In step 1252 the wireless terminal generates a signal conveying the identified stored discovery interval portion to be transmitted from step 1244. Then, in step 1254 the wireless terminal transmits the generated signal conveying the identified discovery interval portion in accordance with the peer to peer timing structure during the discovery interval using the air link resource, e.g., segment, dedicated to the device ID currently being held by the wireless terminal.

Returning to step 1246, in step 1246 the wireless terminal determines the wireless terminal mode of operation with regard to transmitting discovery information. If the wireless terminal is in low rate discovery transmit mode, then operation proceeds from step 1246 to step 1248, where the device is controlled to refrain from transmitting during the discovery interval. However, if the device is in high rate discovery transmit mode, then operation proceeds from step 1246 to step 1250. In step 1250, the wireless terminal identifies a stored discovery interval portion to be transmitted. In some embodiments, the identified portion is a previously transmitted portion. Stored recurring peer to peer timing/frequency structure information 1206 and discovery information sets including discovery information portions 1228 are inputs to step 1250.

Operation proceeds from step 1250 to step 1256. In step 1256 the wireless terminal generates a signal conveying the identified stored discovery interval portion to be transmitted from step 1250. Then in step 1258, the wireless terminal transmits the generated signal conveying the identified discovery interval portion from step 1250 in accordance with the peer to peer timing/frequency structure during the discovery interval using the air link resource, e.g., segment, dedicated to the device ID being held by the wireless terminal.

In some embodiments, when in high rate discovery transmit mode, the wireless terminal executes 1 iteration of steps 1244, 1252 and 1254 for K iterations of steps 1250, 1256 and 1258. For example, in one exemplary embodiment where discovery information in generated in sets of 4 portions, there is 1 iteration of step 1244, 1252 and 1254 corresponding to 4 iterations of steps 1250, 1256 and 1258.

In some embodiments, e.g., embodiments supporting proxying techniques, discovery information portions are communicated using additional interval resources. For example, a discovery interval portion communicated in step 1258 may, and in some embodiments is, a discovery interval portion which has been previously transmitted in a low rate interval resource in step 1254.

In some other embodiments, different discovery interval portions are communicated when transmitting using a low rate interval resource than when using an additional interval resource. For example a first set of discovery information is communicated using low rate discovery interval resources via the transmissions of multiple iterations of step 1254, and a second set of discovery information is communicated using the additional discovery interval resources via the transmissions of multiple iterations of step 1258. In one such embodiment there are more iterations of step 1258 than step 1254 for a given time interval.

Figure 13:
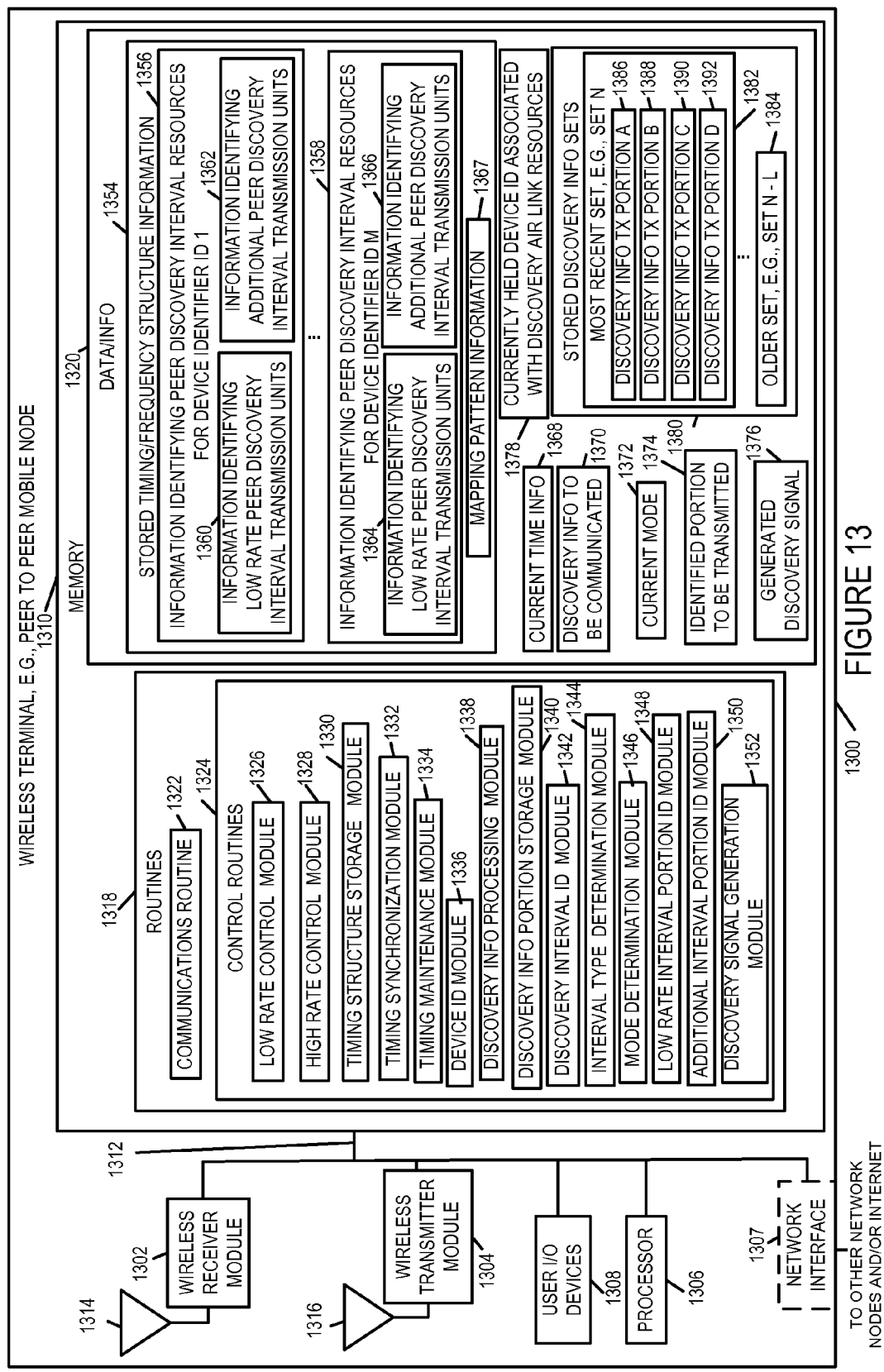
FIG. 13 is a drawing of an exemplary wireless terminal, e.g., peer to peer mobile node, which transmits discovery information portions in accordance with an exemplary embodiment.

FIG. 13 is a drawing of an exemplary wireless terminal 1300, e.g., a peer to peer mobile node which transmits discovery information, in accordance with an exemplary embodiment. Wireless terminal 1300 is, e.g., one of the peer to peer communications devices (102, 104, 106, 108, 110) of system 100 of FIG. 1. Exemplary wireless terminal 1300 includes a wireless receiver module 1302, a wireless transmitter module 1304, user I/O devices 1308, a processor 1306, a memory 1310 coupled together via a bus 1312 over which the various elements may interchange data and information. In some embodiments, wireless terminal 1300 also include network interface 1307 for coupling the wireless terminal to other network nodes and/or the Internet, e.g., via a wired backhaul network.

Memory 1310 includes routines 1318 and data/information 1320. The processor 1306, e.g., a CPU, executes the routines 1318 and uses the data/information 1320 in memory 1310 to control the operation of the wireless terminal 1300 and implement methods, e.g., the method of flowchart 1100 of FIG. 11 or the method of flowchart 1200 of FIG. 12.

Wireless receiver module 1302, e.g., an OFDM or CDMA receiver, is coupled to receive antenna 1314 via which the wireless terminal 1300 receives a timing reference signal, e.g., a beacon signal, used to synchronize to a peer to peer timing structure. Wireless receiver module 1302 also receives discovery information signals conveying discovery information portions from other wireless terminals which are the source of discovery information and/or from other nodes, e.g., assist nodes and/or server nodes which are assisting peer discovery by retransmitting portions of low rate peer discovery information.

Wireless transmitter module 1304, e.g., an OFDM or CDMA transmitter, is coupled to transmit antenna 1316 via which the wireless terminal 1300 transmits discovery signals. In low rate discovery transmit mode the wireless terminal 1300 transmits discovery information portions during low rate discovery intervals using low rate discovery interval transmission units associated with an identifier that it currently holds, while it refrains from transmitting discovery information portions during additional discovery intervals associated with the identifier that it currently holds. In high rate discovery mode the wireless terminal 1300 transmits discovery signal portions during the low rate discovery intervals using low rate discovery interval transmission units associated with the identifier that it currently holds and transmits discovery signal portions during the additional discovery intervals using the additional discovery interval transmission units associated with the identifier that it currently holds.

User I/O devices 1308 include, e.g., a microphone, keyboard, keypad, switches, camera, speaker, display, etc. User I/O devices 1308 allow a user of wireless terminal 1300 to input data/information, access output data/information, and control at least some functions of the wireless terminal, e.g., initiate the broadcasting of one or more types of discovery information. Network interface 1307, where included, allows the wireless terminal 1300 to be coupled to other network nodes and/or the Internet via a backhaul network.

Routines 1318 include a communications routine 1322 and control routines 1324. The communications routine 1322 implements the various communications protocols used by the wireless terminal 1300. The control routines 1324 include a low rate control module 1326, a high rate control module 1328, a timing structure storage module 1330, a timing synchronization module 1332, a timing maintenance module 1334, a device ID module 1336, a discovery information processing module 1338, a discovery information portion storage module 1340, a discovery interval identification module 1342, a interval type determination module 1344, a mode determination module 1346, a low rate interval portion identification module 1348, an additional interval portion identification module 1350, and a discovery signal generation module 1352.

Data/information 1320 includes stored timing/frequency structure information 1354, information identifying a currently held device identifier associated with discovery air link resources 1378, current time information 1368, discovery information to be communicated 1370, stored discovery information sets 1380, information identifying the current discovery information transmit mode 1372, an identified portion to be transmitted 1374, and a generated discovery signal 1376. Stored discovery information sets 1380 includes a most recent discovery information set 1382, e.g., set N, and older generated discovery information sets such older discovery information set 1384, e.g., set N-L, where N and L are integers. Each set of generated discovery information to be transmitted includes multiple portions. In this exemplary embodiment, set 1380 includes 4 portions (discovery information TX portion A 1386, discovery information TX portion B 1388, discovery information TX portion C 1390, discovery information TX portion D 1392).

The stored timing/frequency structure information 1354 includes a plurality of sets of information identifying peer discovery interval air link resources corresponding to different identifiers which may be temporarily associated with wireless terminal 1300 (information identifying peer discovery interval resources for device identifier ID 1 1356, . . . , information identifying peer discovery interval resources for device identifier ID M 1358), and mapping pattern information 1367. Information identifying peer discovery interval resources for device identifier ID 1 1356 includes information identifying low rate peer discovery interval transmission units associated with device ID 1 1360 and information identifying additional discovery interval transmission units associated with device ID 1 1362. Similarly, information identifying peer discovery interval resources for device identifier ID M 1358 includes information identifying low rate peer discovery interval transmission units associated with device identifier M 1364 and information identifying additional discovery interval transmission units associated with device identifier M 1366. Mapping pattern information 1367 includes information defining a mapping pattern of generated discovery portions to particular transmission units. Information described with respect to FIGS. 2, 3, 4, 5, 9 and/or 10 includes exemplary information included as part of the timing/frequency structure information 1354.

The stored timing/frequency structure information 1354 includes information defining a peer discovery transmission schedule, the structure indicating a plurality of ordered transmission units available for transmitting peer discovery information, the stored information including information indicating transmission units to be used for low rate discovery transmissions and additional transmission units to be used for high rate discovery transmissions, the stored information indicating more transmission units for high rate discovery transmissions than for low rate discovery transmissions. Information identifying low rate peer discovery interval transmission units 1360 identifies fewer transmission units, e.g., segments, than information identifying additional discovery interval transmission units 1362. Similarly, information identifying low rate peer discovery interval transmission units 1364 identifies fewer transmission units, e.g., segments, than information identifying additional discovery interval transmission units 1366. In one embodiment, the ratio between low rate peer discovery transmission units to additional transmission units is 1:4. See FIG. 5.

Low rate control module 1326 controls the wireless transmitter module 1304 to transmit a portion of peer discovery information in a set of peer discovery information using a transmission unit corresponding to a low rate discovery transmission. For example, consider that wireless terminal 1300 currently holds device identifier ID M, low rate control module 1354 controls the wireless transmitter module 1304 to transmit a discovery portion during an interval identified by information 1364 using a transmission unit identified by information 1364.

High rate control module 1328 controls the wireless transmitter module 1304 to transmit a previously transmitted portion of a set of peer discovery information using a transmission unit corresponding to high rate discovery transmissions. For example, consider that the wireless terminal 1300 currently holds device identifier ID M, high rate control module 1328 controls the wireless transmitter module 1304 to transmit a discovery portion during an interval identified by information 1366 using a transmission unit identified by information 1366, wherein a discovery information portion transmitted during an additional discovery interval has been previously transmitted during a prior low rate discovery interval.

Timing structure storage module 1330 stores information defining a peer discovery transmission structure, e.g., a recurring timing/frequency structure. In some embodiments, the storage is part of a device configuration operation and/or device initialization operation. Stored timing/frequency structure information 1354 represents an output of module 1330. The stored timing structure information 1354 includes information indicating a plurality of ordered transmission units available for transmitting peer discovery information, the stored information including information indicating transmission units to be used for low rate discovery transmissions and additional transmission units to be used for high rate discovery transmissions, the stored information indicating more transmission units for high rate discovery transmission than for low rate discovery transmissions.

Timing synchronization module 1332 synchronizes internal timing within wireless terminal 1300 with respect to an external reference, e.g., a received beacon signal, such that wireless terminal 1300 has its timing within the peer to peer recurring timing structure coordinated with respect to other peer to peer devices in the vicinity. Timing maintenance module 1334 maintains timing within wireless terminal 1300 on an ongoing basis, outputting current time information 1368.

Device ID module 1336 performs functions including acquiring a device identifier associated with a set of discovery interval air link resources to be used temporarily by wireless terminal 1300, determining whether or not wireless terminal 1300 currently holds such a device identifier, and relinquishing a currently held device identifier.

Discovery information processing module 1338 processes discovery information to be communicated 1370 to create discovery interval transmission portions. In some embodiments, the processing of module 1338 includes performing a secure hash function operation. FIG. 6 and FIG. 7 illustrate exemplary processing that may be performed by module 1338. Discovery information portion storage module 1340 stores the processing outputs from module 1338 in stored discovery information sets 1380.

Discovery information identification module 1342 determines whether or not a discovery interval air link resource in the recurring peer to peer timing/frequency structure is associated with a device identifier currently held by wireless terminal 1300. Interval type determination module 1344 determines whether a discovery interval air link resource is a low rate peer discovery interval air link resource or an additional discovery interval air link resource. Mode determination module 1346 determines the current mode 1372 of wireless terminal 1300 with regard to the transmission of discovery information, e.g., (i) a low rate discovery information transmit mode in which the wireless terminal 1300 transmits discovery information portions using low rate peer discovery interval air link resources but does not use additional discovery interval air link resources or (ii) a high rate discovery information transmit mode in which the wireless terminal 1300 transmits discovery information portions using both low rate peer discovery interval air link resources and additional discovery interval air link resources. The discovery interval air link resources are sometimes referred to alternatively as discovery interval transmission units or discovery interval segments.

Low rate portion identification module 1348 identifies a stored discovery interval portion to be transmitted during a low rate peer discovery interval by wireless terminal 1300 from the stored discovery information 1380 in accordance with the stored timing/frequency structure information 1354. Additional interval portion identification module 1350 identifies a stored discovery interval portion to be transmitted during an additional discovery interval by wireless terminal 1300 from the stored discovery information 1380 in accordance with the stored timing/frequency structure information 1354. A portion identified to be transmitted during an additional discovery interval is a portion which has been previously transmitted during a prior low rate peer discovery interval. Identified portion to be transmitted 1374 can be an output of either module 1348 or module 1350, and it is an input to discovery signal generation module 1352. Discovery signal generation module 1352 generates a discovery signal to convey an identified discovery interval portion to be transmitted. Generated discovery signal 1376 is an output of module 1352.

Wireless transmitter module 1302 transmits portions of peer discovery information. The low rate control module 1326 controls the wireless transmitter module 1302 to transmit a first portion of a set of peer discovery information using a transmission unit corresponding to low rate discovery transmissions. The high rate control module 1328 controls the wireless transmitter module 1302 to transmit a portion of a set of peer discovery information using a transmission unit corresponding to high rate discovery transmissions, e.g., a previously transmitted portion of a set of peer discovery information. For some cases, the previously transmitted portion of a set of peer discovery information corresponds to a different set of peer discovery information than the set of peer discovery information which includes the first portion. For some other cases, the previously transmitted portion of a set of peer discovery information corresponds to the same set of peer discovery information as the first portion. The high rate control module 1328, in some embodiments, controls the wireless transmitter module 1302 to transmit a previously transmitted portion following transmission of the first portion. At times, transmitting a previously transmitted portion precedes transmission of another portion of peer discovery information using another transmission unit corresponding to low rate discovery transmissions.

In various embodiments, the set of peer discovery information including the first portion includes a total of K portions, e.g., 4 portions. In some such embodiments, the wireless transmitter module 1302 is also for transmitting additional portions of peer discovery information in addition to said first portion and said previously transmitted portion. In some such embodiments, the high rate control module controls the wireless transmitter module 1302 to transmit K−1 additional portions of peer discovery information using transmission units corresponding to high rate discovery transmissions following transmission of said first portion and prior to transmission of said another portion. For example, consider that K=4. The wireless terminal 1300 transmits in order: (i) the first portion using a first low rate discovery transmission unit; (ii) a previously transmitted discovery portion using a first additional transmission unit associated with high rate transmissions; (iii) a second previously transmitted discovery portion using a second additional transmission unit associated with high rate transmissions; (iv) a third previously transmitted discovery portion associated with high rate transmissions; (v) a fourth previously transmitted discovery portion associated with high rate transmissions; and (vi) a second portion using a second low rate discovery transmission unit. The transmission sequence is such that during some times, the first portion transmitted using a low rate discovery transmission unit and the K−1 discovery portions using high rate discovery transmission units are all from the same set of peer discovery information.

In some embodiments, the previously transmitted portion and the K−1 additional portions are controlled to be transmitted consecutively using transmission units corresponding to high rate peer discovery transmissions following transmission of the first portion using a low rate discovery transmission unit. For some embodiments, the previously transmitted portion and the K−1 additional portions are all from the same set of peer discovery information. Refer to the example of FIG. 10. In some other embodiments, during some intervals of the recurring structure, the previously transmitted portion and the K−1 additional portions are all from the same set of peer discovery information, while during some other intervals in the recurring structure the previously transmitted portion and the K−1 additional portions include members from two different sets of discovery information. Refer to FIG. 9.

Figure 14:
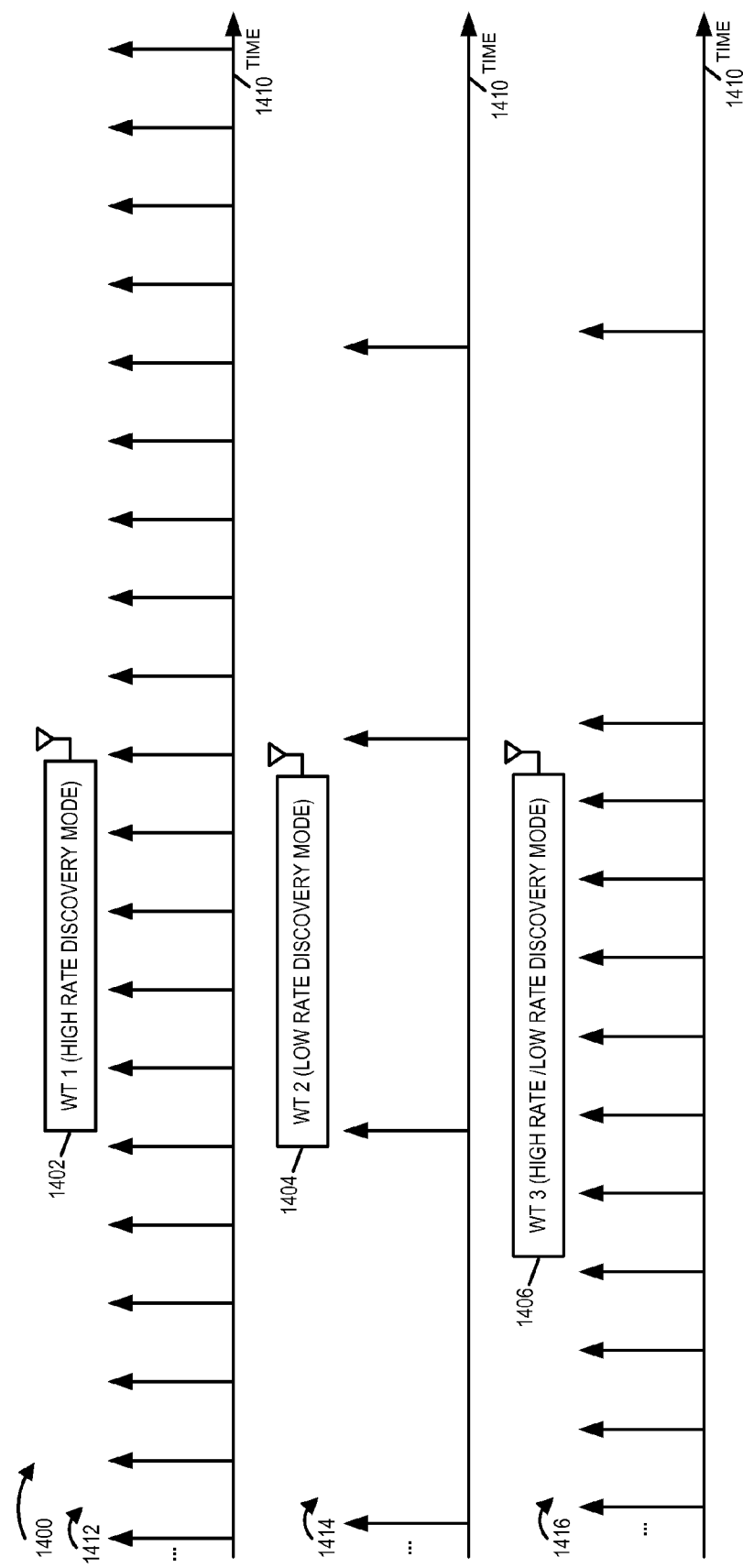
FIG. 14 is a drawing illustrating exemplary nodes in a peer to peer communications system and the transmission of discovery information at different rates.

FIG. 14 is a drawing 1400 illustrating exemplary nodes in a peer to peer communications system and the transmission of discovery information. The exemplary nodes are, e.g., any of the peer to peer communications devices (102, 104, 106, 108, 110) of FIG. 1. The exemplary nodes include a first wireless terminal 1402, e.g., a peer to peer mobile node, which is operating in a high rate discovery mode and which is transmitting discovery information at a high rate, as indicated by discovery signals 1412 being transmitted along time axis 1410. The exemplary nodes also include a second wireless terminal 1404, e.g., a second peer to peer mobile node, which is operating in a low rate discovery mode and which is transmitting discovery information at a low rate, as indicated by discovery signals 1414 being transmitted along time axis 1410. The exemplary nodes also include a third wireless terminal 1406, e.g., a third peer to peer mobile node, which is operating during a first time in a high rate discovery mode and is transmitting discovery information at a high rate, but then changes to operate in a low rate discovery mode and transmits discovery information at a low rate, as indicated by discovery signals 1416 being transmitted along time axis 1410. In some embodiments, at least some of the wireless terminals perform discovery information transmissions in one mode but not the other. In some embodiments, at least some of the wireless terminals are multi-mode with regard to the transmission of discovery information, e.g., transmitting at high rate at some times while transmitting at a low rate at other times.

Figure 15A:
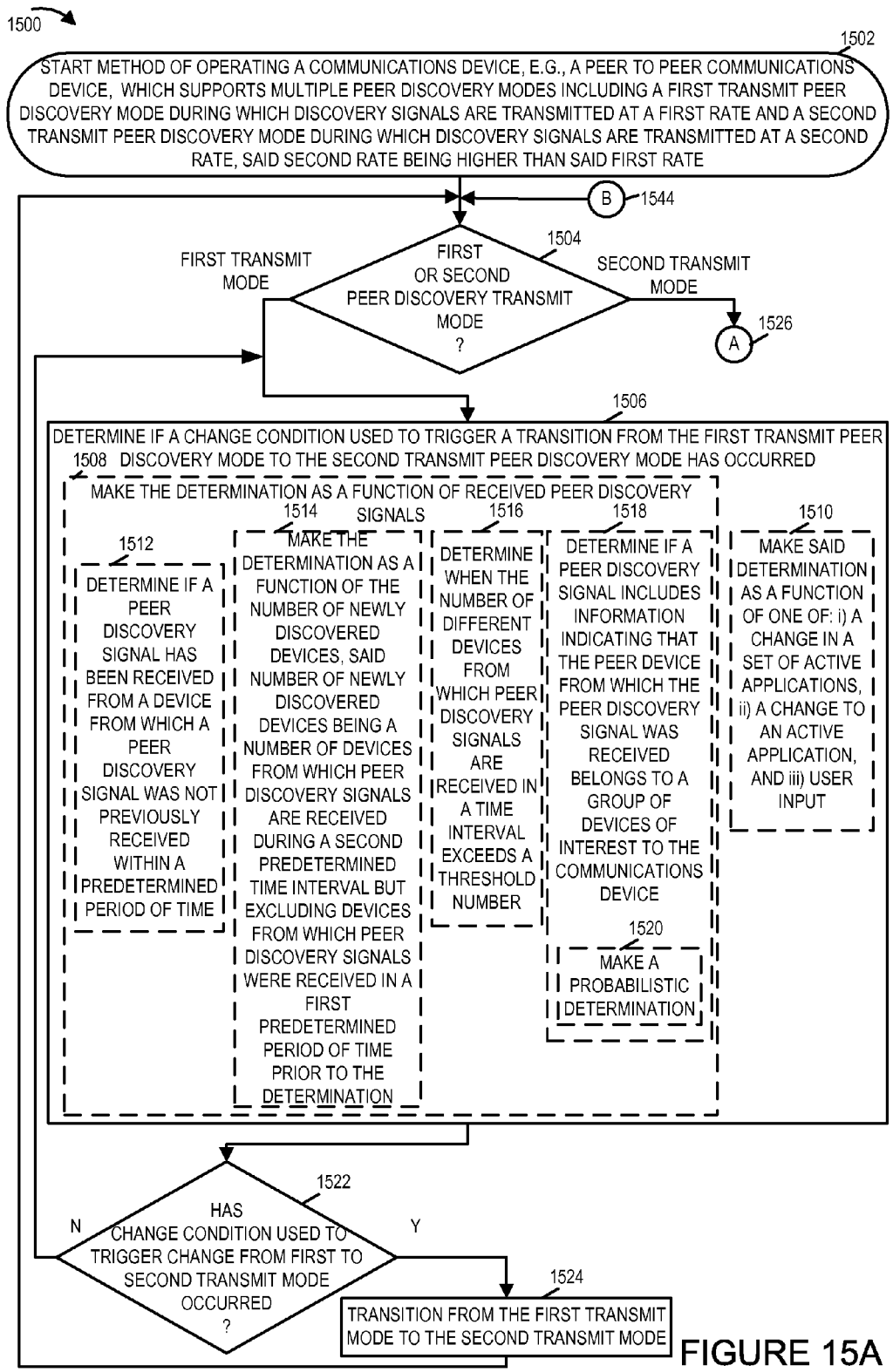
FIG. 15, comprising the combination of FIG. 15A and FIG. 15B, is a flowchart of an exemplary method of operating a communication device in accordance with an exemplary embodiment.

FIG. 15, comprising the combination of FIG. 15A and FIG. 15B, is a flowchart 1500 of an exemplary method of operating a communication device in accordance with an exemplary embodiment. The communications device, e.g., a peer to peer communications device, supports multiple peer discovery modes including a first transmit peer discovery mode during which discovery signals are transmitted at a first rate and a second transmit peer discovery mode during which discovery signals are transmitted at a second rate, said second rate being higher than said first rate.

Operation starts in step 1502, where the communications device is powered on and initialized. Initialization of start step 1502 may, and sometimes does, include setting the communications device in one of the first transmit peer discovery mode and the second transmit peer discovery mode. Operation proceeds from start step 1502 to step 1504. In step 1504, the communications device determines whether the communications device is in the first or second peer discovery transmit mode and proceeds accordingly. If the communications device is in the first peer discovery transmit mode, operation proceeds from step 1504 to step 1506. However, if the communications device is in the second peer discovery transmit mode, then operation proceeds from step 1504 via connecting node A 1526 to step 1528.

Returning to step 1506, in step 1506 the communications device determines if a change conditions used to a trigger a transition from the first transmit peer discovery mode to the second transmit peer discovery mode has occurred. Step 1506 includes one or more of sub-steps 1508 and 1510.

In sub-step 1508 the communications device makes the determination as a function of received peer discovery signals. Sub-step 1508 includes one or more of sub-steps 1512, 1514, 1516, and 1518. In sub-step 1512, the communications device determines if a peer discovery signal has been received from a device from which a peer discovery signal was not previously received within a predetermined period of time. In sub-step 1514, the communications device makes the determination as a function of the number of newly discovered devices, said number of newly discovered devices being a number of devices from which peer discovery signals are received during a second predetermined time interval but excluding devices from which peer discovery signals were received in a first predetermined period of time prior to the determination. For example, a detected high rate of change of received peer discovery information may indicate a rapidly changing environment, and the communications device may be triggered to switch into high rate transmit mode so that others will be able to detect its presence. The device may desire it advertise its presence at a high rate for at least an interval of time since an increasing number of new devices are present in the area. In sub-step 1516, the communications device determines when the number of different devices from which peer discovery signals are received in a time interval exceeds a threshold number. For example, the device may wait until a minimum number of devices, e.g., devices of interest, have been detected by it in its vicinity before it decides to switch to a high rate mode. In sub-step 1518, the communications device determines if a peer discovery signal includes information indicating that the peer device from which the peer discovery signal was received belongs to a group of devices of interest to the communications device. Thus the communications device may be triggered to transition into a high rate when it detects the presence of a relevant peer. In some embodiments, sub-step 1518 includes sub-step 1520, in which the communications device makes a probabilistic determination. In some embodiments, the probabilistic determination is a determination based on a portion of an ID. For example, a partial match may trigger a transition into the high rate transmit mode. In various embodiments, the device in said group include at least one of the following: i) a device corresponding to an entry in a buddy list stored in said communications device; ii) a device that provides a service available to said communications device; and iii) a device that implements an application identified in information stored in said communications device. Entries on the buddy list are, e.g., family members, friends, business associates, member of a club or group, members of an organization, etc.

Returning to sub-step 1510, in sub-step 1510, the communications device makes the determination as a function of one of: i) a change in a set of active applications, ii) a change to an active application, and iii) user input. A change to a set of active application may include a new or dormant application being started, and it may be desirable to switch to high rate peer discovery transmit mode to execute the application and communicate with other devices promptly and/or more efficiently. Exemplary changes to active applications include a mode change of an application, a configuration change of an application, and a parameter setting change of an application.

Operation proceeds from step 1506 to step 1522. In step 1522 the communications device proceeds based on the determination of step 1506. If the determination of step 1506 is that a change condition used to trigger a change from the first transmit peer discovery mode to the second transmit peer discovery mode has not occurred, then operation proceeds from step 1522 to the input of step 1506. However if the determination of step 1506 is that a change condition used to trigger a change from the first transmit peer discovery mode to the second transmit peer discovery mode has occurred, then operation proceeds from step 1522 to step 1524. In step 1524 the communications device transitions from the first transmit peer discovery mode to the second transmit peer discovery mode. Operation proceeds from step 1524 to step 1504.

Returning to step 1528, in step 1528 the communications device determines if a change condition used to trigger a transition from the second transmit peer discovery mode to the first transmit peer discovery mode has occurred. Step 1528 includes one or more of sub-steps 1530, 1532, 1534 and 1535. In sub-step 1530 the communications device determines if a timer has expired indicating passing of a time from the most recent time a condition used to trigger a transition from the first peer discovery transmit rate and/or the first transmit peer discovery mode to the second peer discovery transmit rate and/or second transmit peer discovery mode was detected. In sub-step 1532 the communications device makes the determination as a function of received peer discovery signals. In some such embodiments, sub-step 1532 includes one or more of sub-step 1536 and 1538. In sub-step 1536 the communications device makes the determination as a function of the number of newly discovered devices, said number of newly discovered devices being a number of devices from which discovery signals are being received during a fourth predetermined time period but excluding device from which peer discovery signals were received in a third predetermined period of time prior to said determination. For example, if the number of newly discovered devices falls off, it may indicate stabilization in the area, and the device may decide to slow down its rate of transmitting peer discovery information and thus switch back to the first mode. In sub-step 1538, the communications device determines when the number of different devices from which peer discovery signals are received in a time interval is below a threshold number. For example, the communications device may decide that the number of devices remaining in its vicinity has fallen off to a level that does not justify its expenditure of its resources, e.g., battery power, to keep transmitting discovery information at a high rate and thus it triggers a transition back to the first mode where it will transmit at a lower rate. In sub-step 1534, the communications device determines whether or not a peer device which was determined to probabilistically belong to a group of devices of interest is not a member of said group of devices of interest. For example, the device may have been transitioned to the second mode based on a partial match in step 1518 and 1520, and additional received discovery information subsequently received indicates that a match does not exist; therefore, the device may be triggered to transition back to the first mode. In sub-step 1535 the communications device makes the determination as a function of change in battery status. For example, a detected change in monitored battery status indicating a low battery condition can be, and sometimes is, used to trigger a change from the second transmit mode to the first transmit mode, thereby conserving the remaining battery power and facilitating longer operating time of the communications device before needing a battery recharge.

Operation proceeds from step 1528 to step 1540. In step 1540 the communications device proceeds depending upon the determination of step 1528. If the determination of step 1528 is that a change condition used to trigger a change from the second transmit peer discovery mode to the first transmit peer discovery mode has not occurred, then the device remains in the second transmit peer discovery mode, and operation proceeds from step 1540 to the input of step 1528. However, if the determination of step 1528 is that a change condition used to trigger a change from the second transmit peer discovery mode to the first transmit peer discovery mode has occurred, then operation proceeds from step 1540 to step 1542. In step 1542 the communications device transitions from the second transmit peer discovery mode to the first transmit peer discovery mode. Operation proceeds from step 1542 to step 1504, via connecting node B 1544.

Figure 16:
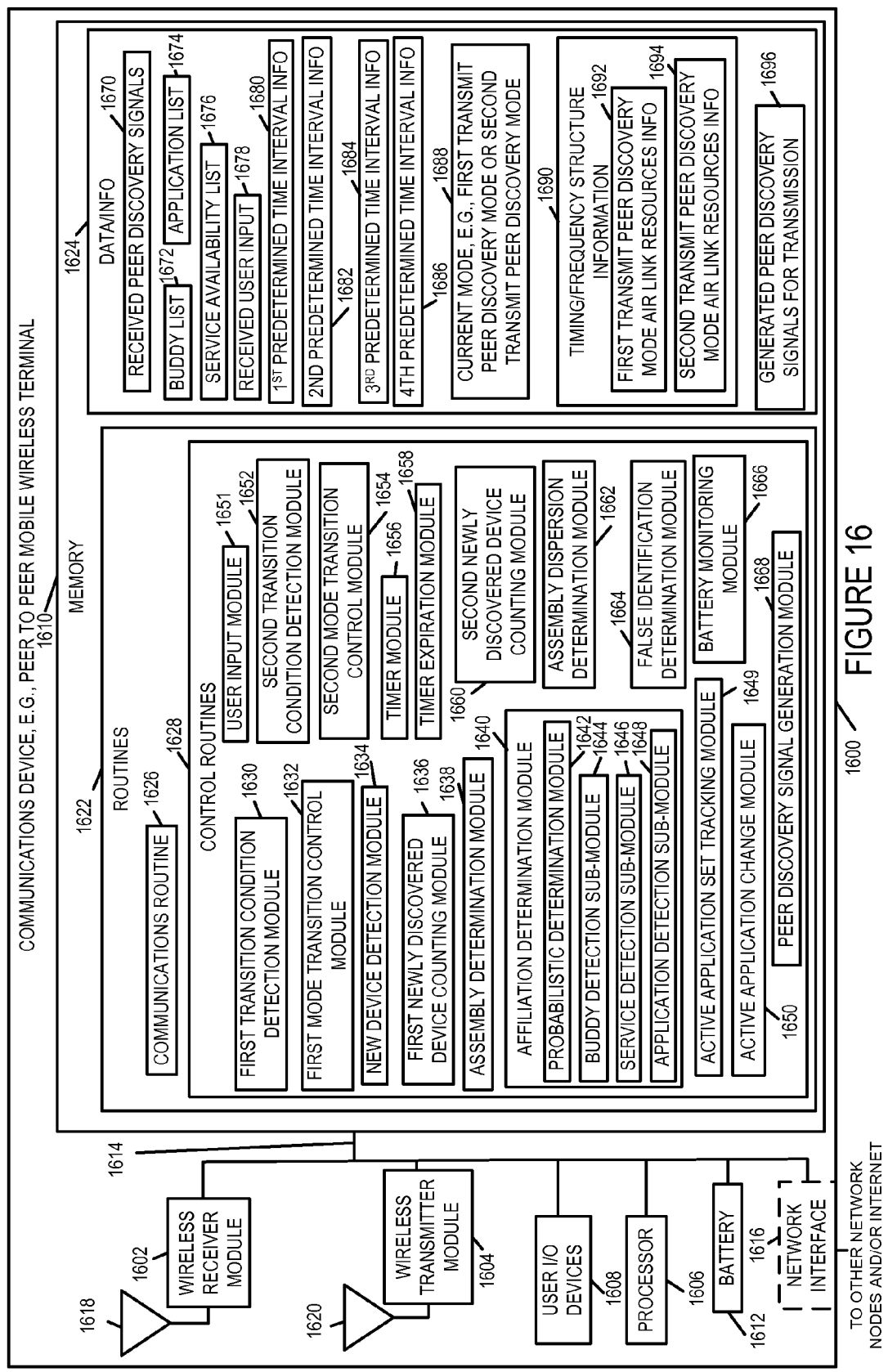
FIG. 16 is a drawing of an exemplary communications device, e.g., a peer to peer mobile wireless terminal, which supports a first transmit peer discovery mode and a second transmit peer discovery mode in accordance with an exemplary embodiment.

FIG. 16 is a drawing of an exemplary communications device 1600, e.g., a peer to peer mobile wireless terminal, in accordance with an exemplary embodiment. Exemplary communications device 1600 supports multiple peer discovery modes including a first transmit peer discovery mode during which peer discovery signals are transmitted at a first rate and a second peer discovery mode during which peer discovery signals are transmitted at a second rate, said second rate being higher than said first rate.

Communications device 1600 includes a wireless receiver module 1602, a wireless transmitter module 1604, a processor 1606, user I/O devices 1608, a memory 1610 and a battery 1612 coupled together via a bus 1614, via which the various elements may interchange data/information. Power distribution and power monitoring is also via bus 1614. Bus 1614 includes a power portion and a data/information portion. In some embodiments communications device 1600 also includes network interface 1616 which is also coupled to bus 1614. The network interface 1616, when included, can be used to couple the communications device 1600 to other network nodes and/or the Internet, e.g., via a backhaul.

Memory 1610 includes routines 1622 and data/information 1624. The processor 1606, e.g., a CPU, executes the routines 1622 and uses the data/information 1624 in memory 1610 to control the operation of the communications device 1600 and implement methods, e.g., the method of flowchart 1500 of FIG. 15.

Wireless receiver module 1602, e.g., an OFDM or CDMA receiver, is coupled to receive antenna 1618 via which the communications device 1600 receives signals from other communications devices, e.g., discovery signals from other peer to peer communications devices. Wireless transmitter module 1604, e.g., an OFDM or CDMA transmitter, is coupled to transmit antenna 1620 via which the communications device transmits signals to other communications devices. Transmitted signals include, e.g., discovery information signals. Discovery information signals can be broadcast at different rates, e.g., a low rate while in a first transmit peer discovery mode and a high rate while in a second transmit peer discovery mode. In some embodiments, the same antenna is used for transmitter and receiver.

User I/O devices 1608 include, e.g., a microphone, a keyboard, a keypad, switches, a camera, a speaker, a display, etc. User I/O devices 1608 allow an operator of communications device 1600 to input user data, access output user data and control at least some functions of the communications device, e.g., select a peer discovery transmit mode of operation.

Battery 1612 provides a power source for communications device 1600. Battery status is monitored and the transmit peer discovery mode of operation can be, and sometimes is, changed as a function of battery status.

Routines 1622 includes a communications routine 1626 and control routines 1628. Communications routine 1626 implements the various communications protocols used by the communications device 1600. Control routines 1628 include a first transition condition detection module 1630, a first mode transition control module 1632, a new device detection module 1634, a first newly discovered device counting module 1636, an assembly determination module 1638, an affiliation determination module 1640, an active application set tracking module 1649, an active application change module 1650, a user input module 1651, a second transition condition detection module 1652, a second mode transition control module 1654, a timer module 1656, a timer expiration module 1658, a second newly discovered device counting module 1660, an assembly dispersion determination module 1662, a false identification determination module 1664, a battery monitoring module 1666, and a peer discovery signal generation module 1668. Affiliation determination module 1640 includes a probabilistic determination module 1642, a buddy detection sub-module 1644, a service detection sub-module 1646 and an application detection sub-module 1648.

Data/information 1624 includes received peer discovery signals 1670, a buddy list 1672, an application list 1674, a service availability list 1676, received user input 1678, $1^{st}$ predetermined time interval information 1680, $2^{nd}$ predetermined time interval information 1682, $3^{rd}$ predetermined time interval information 1684, $4^{th}$ predetermined time interval information 1686, a current mode of operation 1688, timing frequency structure information 1690 and generated peer discovery signals for transmission 1696. The timing/frequency structure information 1690 includes first transmit mode peer discovery air link resources information 1692 and second transmit peer discovery mode air link resources information 1694.

First transition condition detection module 1630 determines if a change condition used to trigger a change from the first transmit peer discovery mode to the second transmit peer discovery mode occurred when the communications device 1600 is operating the first transmit peer discovery mode. At times, first transition condition detection module 1630 makes the determination as a function of a received peer discovery signal. Sometimes, the first transition condition detection module 1630 makes the determination as a function of a plurality of received peer discovery signals. First mode transition control module 1632 controls the communications device 1600 to transition from the first transmit peer discovery mode to the second transmit peer discovery mode when the first transition condition detection module 1630 detects that the change condition used to trigger a change from the first transmit peer discovery mode to the second transmit peer discovery mode has occurred.

New device detection module 1634 determines if a peer discovery signal has been received from a device from which a peer discovery signal was not previously received within a predetermined period of time. First transition condition detection module 1630 can, and sometimes does, make a change condition determination as a function of a new device detection module 1634 determination.

First newly discovered device counting module 1636 determines a number of newly discovered devices, said number of newly discovered devices being a number of device from which peer discovery signals are received during a second predetermined time interval but excluding devices from which peer discovery signals were received in a first predetermined period of time prior to said determination if a change condition has occurred. First transition condition detection module 1630 can, and sometimes does, make a change condition determination as a function of the number of newly discovered devices as reported by module 1636. $1^{st}$ predetermined time interval information 1680 and $2^{nd}$ predetermined time interval information 1682 are used by first newly discovered device counting module 1636 in determining a number of newly discovered devices.

Assembly determination module 1638 determines when the number of different devices from which peer discovery signals are received in a time interval exceeds a threshold number. First transition condition detection module 1630 can, and sometimes does, make a change condition determination as a function of an assembly determination module 1638 determination.

Affiliation determination module 1640 determines if a peer discovery signal includes information indicating that a peer device from which the peer discovery signal was received belongs to a group of devices of interest to the communications device 1600. First transition condition detection module 1630 can, and sometimes does, make a change condition determination as a function of the affiliation determination module 1640 determination.

Probabilistic determination module 1642 makes a probabilistic determination as to whether a peer discovery signal includes information indicating that the peer device from which the peer discovery signal was received belongs to a group of devices of interest to the communications device. For example, one received per discovery signal may include a portion of a set of peer discovery information, and the probabilistic determination module 1642 can make a probabilistic determination based on the received portion of the set of discovery information, even though the complete set is unavailable at the current time to the communications device 1600. In some embodiments, an identifier such as a device identifier carried in a discovery information signal conveys less than the full set of bits needed to perform a unique identification but may include a sufficient number of bits to perform a positive identification with an acceptable degree of certainty. For example, an abbreviated identifier may be communicated in a discovery information portion to save air link resources, with the understanding that false positive identifications may occasionally occur. In some embodiments, the probabilistic determination is a determination based on a portion of an ID.

Buddy detection sub-module 1644 uses buddy list 1672, e.g., stored information identifying devices and/or users of devices designated as buddies of the communications device 1600, to determine if a received peer discovery signal is from a device corresponding to an entry in the stored buddy list.

Service detection sub-module 1646 uses service availability list 1676, e.g. stored information identifying services available to the communication device 1600, to determine if a received peer discovery signal is from a device corresponding to an entry in said stored discovery availability list 1676.

Application detection sub-module 1648 uses application list 1674, e.g., stored information identifying applications of interest to the communications device 1600, to determine if a received peer discovery signal is from a device corresponding to an entry in the stored application list 1674.

Active application set tracking module 1649 determines if a change in a maintained set of application has occurred. First transition condition detection module 1630 can, and sometimes does, make a change condition determination as a function of the active application set tracking module 1649 determination.

Active application change module 1650 determines if a change to an active application has occurred. Exemplary changes to active applications include a mode change of an application, a configuration change of an application, and a parameter setting change of an application. First transition condition detection module 1630 can, and sometimes does, make a change condition determination as a function of the active application change module 1650 determination.

User input module 1651 receives input from a user of the communications device 1600 via a user I/O device included in user I/O devices 1608, e.g., a user selection, request or command to change to the second peer discovery transmit mode. First transition condition detection module 1630 can, and sometimes does, make a change condition determination as a function received user input from the user input module 1651.

Second transition condition detection module 1652 determines if a change condition used to trigger a change from the second transmit peer discovery mode to the first transmit peer discovery mode occurred when the communications device is operating the second transmit peer discovery mode. Second transition condition detection module 1652 at times makes the determination if a change condition used to trigger a change from the second transmit peer discovery mode to the first transmit peer discovery mode occurred as a function of a received peer discovery signal. Second mode transition control module 1654 controls the communications device to transition from the second transmit peer discovery mode to the first transmit peer discovery mode when the second condition detection module 1652 detects that a change condition used to trigger a change from the second transmit peer discovery mode to the first transmit peer discovery mode has occurred.

Timer module 1656 tracks the amount of time since the most recent time a condition used to trigger a transition from the first rate and/or first mode to the second rate and/or second mode was detected. Timer expiration module 1658 determines if the amount of time indicated by the timer module 1656 exceeds an expiration time. The second transition condition detection module 1652 can, and sometimes does, determine if a change condition used to trigger a change from the second transmit peer discovery mode to the first transmit peer discovery mode has occurred as a function of the timer expiration module 1658 determination.

Second newly discovered device counting module 1660 determines a number of newly discovered devices, said number of newly discovered devices being a number of devices from which peer discovery signals are received during a fourth predetermined time interval but excluding device from which peer discovery signals were received in a third predetermined period of time prior to said determination if a change condition has occurred. Third predetermined time interval information 1684 and fourth predetermined time interval information 1686 are used by module 1660 in obtaining a count. The second transition condition detection module 1652 can, and sometimes does, determine if a change condition used to trigger a change from the second transmit peer discovery mode to the first transmit peer discovery mode has occurred as a function of the number of newly discovered devices as annunciated by second newly discovered devices counting module 1660.

Assembly dispersion determination module 1662 determines when the number of different devices from which peer discovery signals are received in a time interval is below a threshold number. The second transition condition detection module 1652 can, and sometimes does, determine if a change condition used to trigger a change from the second mode to the first mode has occurred as a function of the assembly dispersion determination module 1662 determination.

False identification determination module 1664 determines if a peer device which had been determined to probabilistically belong to a group of device of interest is not a member of the group of devices of interest. The second transition condition detection module 1652 can, and sometimes does, determine if a change condition used to trigger a change from the second transmit peer discovery mode to the first transmit peer discovery mode has occurred as a function of the false identification determination module 1664 determination.

Battery monitoring module 1666 monitors the amount of reserve battery power remaining in the battery 1612 and determines the current battery status condition. The second transition condition detection module 1652 can, and sometimes does, determine if a change condition used to trigger a change from the second mode to the first mode has occurred as a function of the battery monitoring module 1666 status determination. For example, in response to a low battery status indication the communications device is transitioned to the first transmit peer discovery mode so that power may be conserved and the device may operate for a longer time before a recharge is needed.

Peer discovery signal generation module 1668 generates peer discovery signals for transmission 1696. Generated peer discovery signals are transmitted at a first rate when the current mode 1688 indicates that the communications device 1600 is currently operating in a first transmit peer discovery mode using air link resources, e.g., segments, identified by information 1692. Generated peer discovery signals are transmitted at a second rate when the current mode 1688 indicates that the communications device 1600 is currently operating in a second transmit peer discovery mode using air link resources, e.g., segments, identified by information 1694.

Figure 17A:
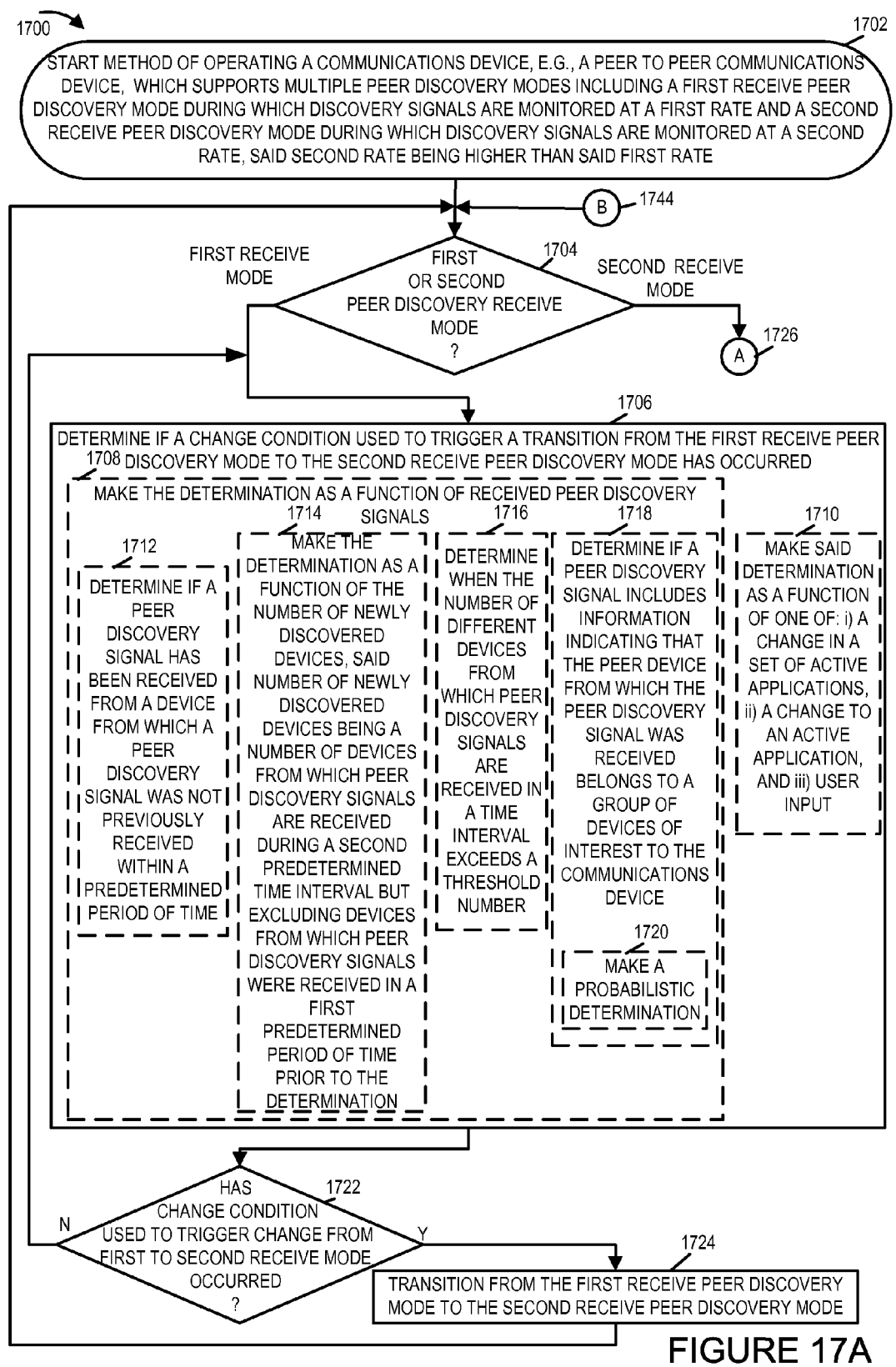
FIG. 17, comprising the combination of FIG. 17A and FIG. 17B, is a flowchart of an exemplary method of operating a communication device in accordance with an exemplary embodiment.

FIG. 17, comprising the combination of FIG. 17A and FIG. 17B, is a flowchart 1700 of an exemplary method of operating a communication device in accordance with an exemplary embodiment. The communications device, e.g., a peer to peer communications device, supports multiple peer discovery modes including a first receive peer discovery mode during which discovery signals are monitored at a first rate and a second receive peer discovery mode during which discovery signals are monitored at a second rate, said second rate being higher than said first rate.

Operation starts in step 1702, where the communications device is powered on and initialized. Initialization of start step 1702 may, and sometimes does, include setting the communications device in one of the first receive peer discovery mode and the second receive peer discovery mode. Operation proceeds from start step 1702 to step 1704. In step 1704, the communications device determines whether the communications device is in the first or second receive peer discovery modes and proceeds accordingly. If the communications device is in the first receive peer discovery mode, operation proceeds from step 1704 to step 1706. However, if the communications device is in the second receive peer discovery mode, then operation proceeds from step 1704 via connecting node A 1726 to step 1728.

Returning to step 1706, in step 1706 the communications device determines if a change conditions used to a trigger a transition from the first receive peer discovery mode to the second receive peer discovery mode has occurred. Step 1706 includes one or more of sub-steps 1708 and 1710.

In sub-step 1708 the communications device makes the determination as a function of received peer discovery signals. Sub-step 1708 includes one or more of sub-steps 1712, 1714, 1716, and 1718. In sub-step 1712, the communications device determines if a peer discovery signal has been received from a device from which a peer discovery signal was not previously received within a predetermined period of time. In sub-step 1714, the communications device makes the determination as a function of the number of newly discovered devices, said number of newly discovered devices being a number of devices from which peer discovery signals are received during a second predetermined time interval but excluding devices from which peer discovery signals were received in a first predetermined period of time prior to the determination. In sub-step 1716, the communications device determines when the number of different devices from which peer discovery signals are received in a time interval exceeds a threshold number. In sub-step 1718, the communications device determines if a peer discovery signal includes information indicating that the peer device from which the peer discovery signal was received belongs to a group of devices of interest to the communications device. In some embodiments, sub-step 1718 includes sub-step 1720, in which the communications device makes a probabilistic determination. In some embodiments, the probabilistic determination is a determination based on a portion of an ID. In various embodiments, the device in said group include at least one of the following: i) a device corresponding to an entry in a buddy list stored in said communications device; ii) a device that provides a service available to said communications device; and iii) a device that implements an application identified in information stored in said communications device.

Returning to sub-step 1710, in sub-step 1710, the communications device makes the determination as a function of one of: i) a change in a set of active applications, ii) a change to an active application, and iii) user input. Exemplary changes to active applications include a mode change of an application, a configuration change of an application, and a parameter setting change of an application.

Operation proceeds from step 1706 to step 1722. In step 1722 the communications device proceeds based on the determination of step 1706. If the determination of step 1706 is that a change condition used to trigger a change from the first receive peer discovery mode to the second receive peer discovery mode has not occurred, then operation proceeds from step 1722 to the input of step 1706. However if the determination of step 1706 is that a change condition used to trigger a change from the first receive peer discovery mode to the second receive peer discovery mode has occurred, then operation proceeds from step 1722 to step 1724. In step 1724 the communications device transitions from the first receive peer discovery mode to the second receive peer discovery mode. Operation proceeds from step 1724 to step 1704.

Returning to step 1728, in step 1728 the communications device determines if a change condition used to trigger a transition from the second receive peer discovery mode to the first receive peer discovery mode has occurred. Step 1728 includes one or more of sub-steps 1730, 1732, 1734 and 1735. In sub-step 1730 the communications device determines if a timer has expired indicating passing of a time from the most recent time a condition used to trigger a transition from the first rate and/or first receive peer discovery mode to the second rate and/or second receive peer discovery mode was detected. In sub-step 1732 the communications device makes the determination as a function of received peer discovery signals. In some such embodiments, sub-step 1732 includes one or more of sub-step 1736 and 1738. In sub-step 1736 the communications device makes the determination as a function of the number of newly discovered devices, said number of newly discovered devices being a number of devices from which discovery signals are being received during a fourth predetermined time period but excluding device from which peer discovery signals were received in a third predetermined period of time prior to said determination. In sub-step 1738, the communications device determines when the number of different devices from which peer discovery signals are received in a time interval is below a threshold number. In sub-step 1734, the communications device determines whether or not a peer device which was determined to probabilistically belong to a group of devices of interest is not a member of said group of devices of interest. In sub-step 1735 the communications device makes the determination as a function of change in battery status. For example, a detected change in monitored battery status indicating a low battery condition can be, and sometimes is, used to trigger a change from the second receive peer discovery mode to the first receive peer discovery mode, thereby conserving the remaining battery power and facilitating longer operating time of the communications device before needing a battery recharge.

Operation proceeds from step 1728 to step 1740. In step 1740 the communications device proceeds depending upon the determination of step 1728. If the determination of step 1728 is that a change condition used to trigger a change from the second receive peer discovery mode to the first receive peer discovery mode has not occurred, then the device remains in the second receive peer discovery mode, and operation proceeds from step 1740 to the input of step 1728. However, if the determination of step 1728 is that a change condition used to trigger a change from the second receive peer discovery mode to the first receive peer discovery mode has occurred, then operation proceeds from step 1740 to step 1742. In step 1742 the communications device transitions from the second receive peer discovery mode to the first receive peer discovery mode. Operation proceeds from step 1742 to step 1704, via connecting node B 1744.

Figure 18:
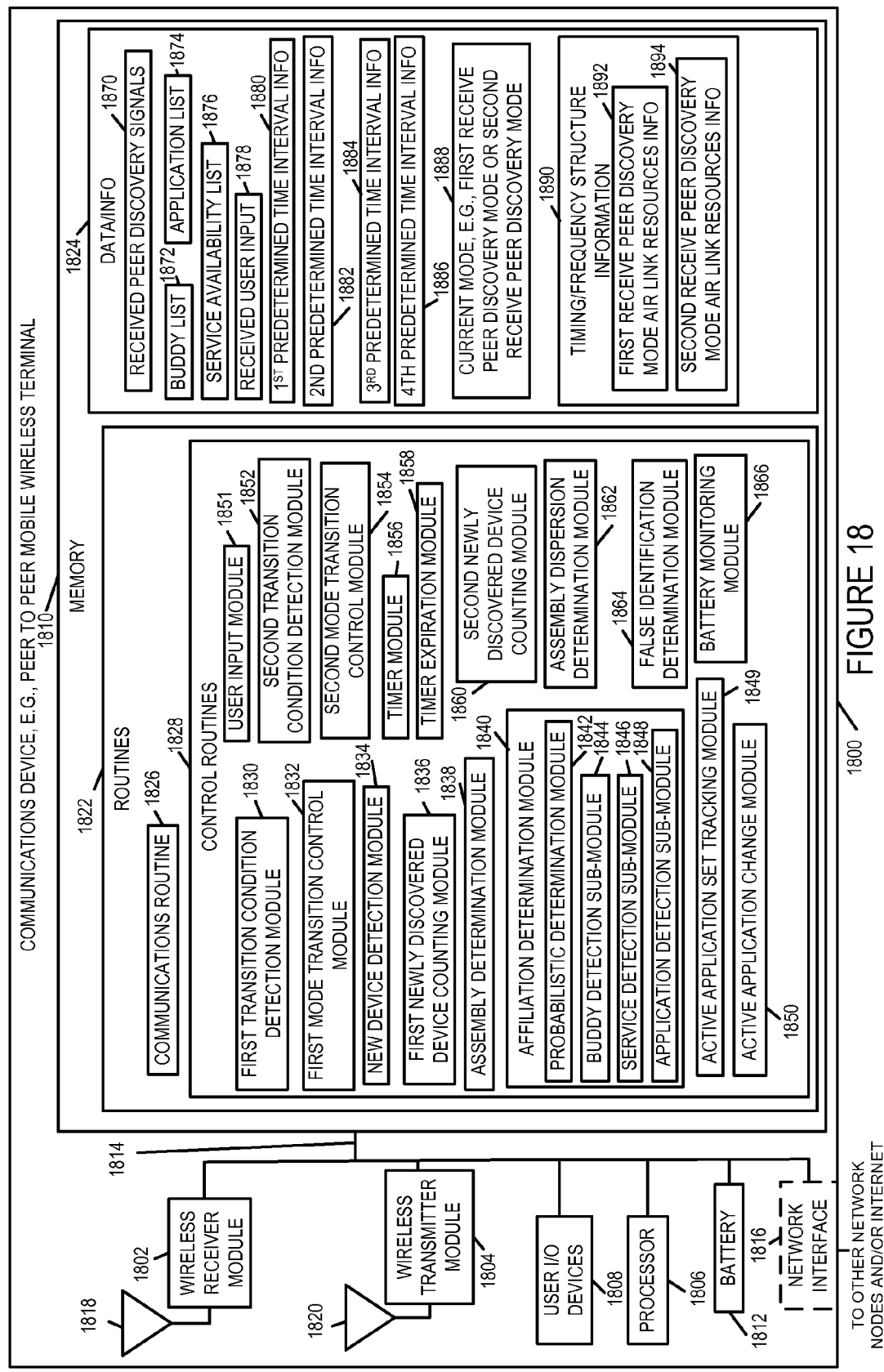
FIG. 18 is a drawing of an exemplary communications device, e.g., a peer to peer mobile wireless terminal, which supports a first receive peer discovery mode and a second receive peer discovery mode in accordance with an exemplary embodiment.

FIG. 18 is a drawing of an exemplary communications device 1800, e.g., a peer to peer mobile wireless terminal, in accordance with an exemplary embodiment. Exemplary communications device 1800 supports multiple peer discovery modes including a first receive peer discovery mode during which peer discovery signals are monitored at a first rate and a second receive peer discovery mode during which peer discovery signals are monitored at a second rate, said second rate being higher than said first rate.

Communications device 1800 includes a wireless receiver module 1802, a wireless transmitter module 1804, a processor 1806, user I/O devices 1808, a memory 1810 and a battery 1812 coupled together via a bus 1814, via which the various elements may interchange data/information. Power distribution and power monitoring is also via bus 1814. Bus 1814 includes a power portion and a data/information portion. In some embodiments communications device 1800 also includes network interface 1816 which is also coupled to bus 1814. The network interface 1816, when included, can be used to couple the communications device 1800 to other network nodes and/or the Internet, e.g., via a backhaul.

Memory 1810 includes routines 1822 and data/information 1824. The processor 1806, e.g., a CPU, executes the routines 1822 and uses the data/information 1824 in memory 1810 to control the operation of the communications device 1800 and implement methods, e.g., the method of flowchart 1700 of FIG. 17.

Wireless receiver module 1802, e.g., an OFDM or CDMA receiver, is coupled to receive antenna 1818 via which the communications device 1800 receives signals from other communications devices, e.g., discovery signals from other peer to peer communications devices and peer to peer traffic signals from other communications devices. Discovery information signals can be monitored at different rates, e.g., a low rate while in a first receive peer discovery mode and a high rate while in a second receive peer discovery mode. Peer discovery information signals are received by wireless receiver module 1802 on air link resources, e.g., segments, identified by first receive peer discovery mode air link resources information 1892 when in the first receive mode of peer discovery operation. Peer discovery information signals are received by wireless receiver module 1802 on air link resources, e.g., segments, identified by second receive peer discovery mode air link resources information 1894 when in the second receive mode of peer discovery operation.

Note that the rate of reception of peer discovery information corresponding to the receive peer discovery mode of communications device 1800 need not be, and sometimes is not, the same as the rate of transmission from another peer discovery device sourcing signals received by communications device 1800. In addition corresponding to a set of monitored discovery information air link resources associated with a particular device identifier, at times, some of the discovery information signals may be sourced from a peer to peer device while other discovery information signals may be sourced from a node functioning to provide discovery assistance. For example, in one case communications device 1800 is in the second receive peer discovery mode, e.g., high receive rate mode, another peer node sourcing peer discovery signals received by device 1800 is in a first transmit peer discovery mode, e.g., low transmit mode, and a peer discovery assist node, situated in the vicinity of device 1800 and the another peer node transmits peer discovery signals on the additional air link resources associated with the device identifier conveying peer discovery signals that would have been transmitted by the another peer node if it had been in the second transmit peer discovery mode of operation.

In another example, device 1800 is in a first, e.g., low rate, receive peer discovery mode, while another peer node transmitting peer discovery signals is in a second, e.g., high rate, transmit peer discovery mode, and device 1800 monitors discovery signals associated with low rate peer discovery air link resources but refrains from monitoring on the air link resources which are used in high rate discovery but not used in low rate discovery.

Wireless transmitter module 1804, e.g., an OFDM or CDMA transmitter, is coupled to transmit antenna 1820 via which the communications device 1800 transmits signals to other communications devices. Transmitted signals include, e.g., discovery information signals and peer to peer traffic signals. In some embodiments, the same antenna is used for transmitter and receiver.

User I/O devices 1808 include, e.g., a microphone, a keyboard, a keypad, switches, a camera, a speaker, a display, etc. User I/O devices 1808 allow an operator of communications device 1800 to input user data, access output user data and control at least some functions of the communications device, e.g., select a peer discovery receive mode of operation.

Battery 1812 provides a power source for communications device 1800. Battery status is monitored and the receive peer discovery mode of operation can be, and sometimes is, changed as a function of battery status.

Routines 1822 includes a communications routine 1826 and control routines 1828. Communications routine 1826 implements the various communications protocols used by the communications device 1800. Control routines 1828 include a first transition condition detection module 1830, a first mode transition control module 1832, a new device detection module 1834, a first newly discovered device counting module 1836, an assembly determination module 1838, an affiliation determination module 1840, an active application set tracking module 1849, an active application change module 1850, a user input module 1851, a second transition condition detection module 1852, a second mode transition control module 1854, a timer module 1856, a timer expiration module 1858, a second newly discovered device counting module 1860, an assembly dispersion determination module 1862, a false identification determination module 1864, and a battery monitoring module 1866.

Affiliation determination module 1840 includes a probabilistic determination module 1842, a buddy detection sub-module 1844, a service detection sub-module 1846 and an application detection sub-module 1848.

Data/information 1824 includes received peer discovery signals 1870, a buddy list 1872, an application list 1874, a service availability list 1876, received user input 1878, $1^{st}$ predetermined time interval information 1880, $2^{nd}$ predetermined time interval information 1882, $3^{rd}$ predetermined time interval information 1884, $4^{th}$ predetermined time interval information 1886, a current mode of operation 1888, and timing frequency structure information 1890. The timing/frequency structure information 1890 includes first receive mode peer discovery air link resources information 1892 and second receive mode peer discovery mode air link resources information 1894.

First transition condition detection module 1830 determines if a change condition used to trigger a change from the first receive peer discovery mode to the second receive peer discovery mode occurred when the communications device 1800 is operating the first receive peer discovery mode. At times, first transition condition detection module 1830 makes the determination as a function of a received peer discovery signal. Sometimes, the first transition condition detection module 1830 makes the determination as a function of a plurality of received peer discovery signals. First mode transition control module 1832 controls the communications device 1800 to transition from the first mode to the second mode when the first transition condition detection module 1830 detects that the change condition used to trigger a change from the first receive peer discovery mode to the second receive peer discovery mode has occurred.

New device detection module 1834 determines if a peer discovery signal has been received from a device from which a peer discovery signal was not previously received within a predetermined period of time. First transition condition detection module 1830 can, and sometimes does, make a change condition determination as a function of a new device detection module 1834 determination.

First newly discovered device counting module 1836 determines a number of newly discovered devices, said number of newly discovered devices being a number of device from which peer discovery signals are received during a second predetermined time interval but excluding devices from which peer discovery signals were received in a first predetermined period of time prior to said determination if a change condition has occurred. First transition condition detection module 1830 can, and sometimes does, make a change condition determination as a function of the number of newly discovered devices as reported by module 1836. $1^{st}$ predetermined time interval information 1880 and $2^{nd}$ predetermined time interval information 1882 are used by first newly discovered device counting module 1836 in determining a number of newly discovered devices.

Assembly determination module 1838 determines when the number of different devices from which peer discovery signals are received in a time interval exceeds a threshold number. First transition condition detection module 1830 can, and sometimes does, make a change condition determination as a function of an assembly determination module 1838 determination.

Affiliation determination module 1840 determines if a peer discovery signal includes information indicating that a peer device from which the peer discovery signal was received belongs to a group of devices of interest to the communications device 1800. First transition condition detection module 1830 can, and sometimes does, make a change condition determination as a function of the affiliation determination module 1840 determination.

Probabilistic determination module 1842 makes a probabilistic determination as to whether a peer discovery signal includes information indicating that the peer device from which the peer discovery signal was received belongs to a group of devices of interest to the communications device. For example, one received peer discovery signal may include a portion of a set of peer discovery information, and the probabilistic determination module 1842 can make a probabilistic determination based on the received portion of the set of discovery information, even though the complete set is unavailable at the current time to the communications device 1800. In some embodiments, the probabilistic determination is a determination based on a portion of an ID.

Buddy detection sub-module 1844 uses buddy list 1872, e.g., stored information identifying devices and/or users of devices designated as buddies of the communications device 1800, to determine if a received peer discovery signal is from a device corresponding to an entry in the stored buddy list.

Service detection sub-module 1846 uses service availability list, e.g. stored information identifying services available to the communication device 1800, to determine if a received peer discovery signal is from a device corresponding to an entry in said stored discovery availability list 1876.

Application detection sub-module 1848 uses application list 1874, e.g., stored information identifying applications of interest to the communications device 1800, to determine if a received peer discovery signal is from a device corresponding to an entry in the stored application list 1874.

Active application set tracking module 1849 determines if a change in a maintained set of application has occurred. First transition condition detection module 1830 can, and sometimes does, make a change condition determination as a function of the active application set tracking module 1849 determination.

Active application change module 1850 determines if a change to an active application has occurred. Exemplary changes to active applications include a mode change of an application, a configuration change of an application, and a parameter setting change of an application. First transition condition detection module 1830 can, and sometimes does, make a change condition determination as a function of the active application change module 1850 determination.

User input module 1851 receives input from a user of the communications device 1800 via a user I/O device included in user I/O devices 1808, e.g., a user selection, request or command to change to the second receive peer discovery mode. First transition condition detection module 1830 can, and sometimes does, make a change condition determination as a function received user input from the user input module 1851.

Second transition condition detection module 1852 determines if a change condition used to trigger a change from the second receive peer discovery mode to the first receive peer discovery mode occurred when the communications device is operating the second receive peer discovery mode. Second transition condition detection module 1852 at times makes the determination if a change condition used to trigger a change from the second receive peer discovery mode to the first receive peer discovery mode occurred as a function of a received peer discovery signal. Second mode transition control module 1854 controls the communications device to transition from the second receive peer discovery mode to the first receive peer discovery mode when the second condition detection module 1852 detects that a change condition used to trigger a change from the second receive peer discovery mode to the first receive peer discovery mode has occurred.

Timer module 1856 tracks the amount of time since the most recent time a condition used to trigger a transition from the first rate to the second rate was detected. Timer expiration module 1858 determines if the amount of time indicated by the timer module 1856 exceeds an expiration time. The second transition condition detection module 1852 can, and sometimes does, determine if a change condition used to trigger a change from the second receive peer discovery mode to the first receive peer discovery mode has occurred as a function of the timer expiration module 1858 determination.

Second newly discovered device counting module 1860 determines a number of newly discovered devices, said number of newly discovered devices being a number of devices from which peer discovery signals are received during a fourth predetermined time interval but excluding device from which peer discovery signals were received in a third predetermined period of time prior to said determination if a change condition has occurred. Third predetermined time interval information 1884 and fourth predetermined time interval information 1886 are used by module 1860 in obtaining a count. The second transition condition detection module 1852 can, and sometimes does, determine if a change condition used to trigger a change from the second mode to the first mode has occurred as a function of the number of newly discovered devices as annunciated by second newly discovered devices counting module 1860.

Assembly dispersion determination module 1862 determines when the number of different devices from which peer discovery signals are received in a time interval is below a threshold number. The second transition condition detection module 1852 can, and sometimes does, determine if a change condition used to trigger a change from the second receive peer discovery mode to the first receive peer discovery mode has occurred as a function of the assembly dispersion determination module 1862 determination.

False identification determination module 1864 determines if a peer device which had been determined to probabilistically belong to a group of device of interest is not a member of the group of devices of interest. The second transition condition detection module 1852 can, and sometimes does, determine if a change condition used to trigger a change from the second receive peer discovery mode to the first receive peer discovery mode has occurred as a function of the false identification determination module 1864 determination.

Battery monitoring module 1866 monitors the amount of reserve battery power remaining in the battery 1812 and determines the current battery status condition. The second transition condition detection module 1852 can, and sometimes does, determine if a change condition used to trigger a change from the second receive peer discovery mode to the first receive peer discovery mode has occurred as a function of the battery monitoring module 1866 status determination. For example, in response to a low battery status indication the communications device is transitioned to the first receive mode so that power may be conserved and the device may operate for a longer time before a recharge is needed.

Figure 19:
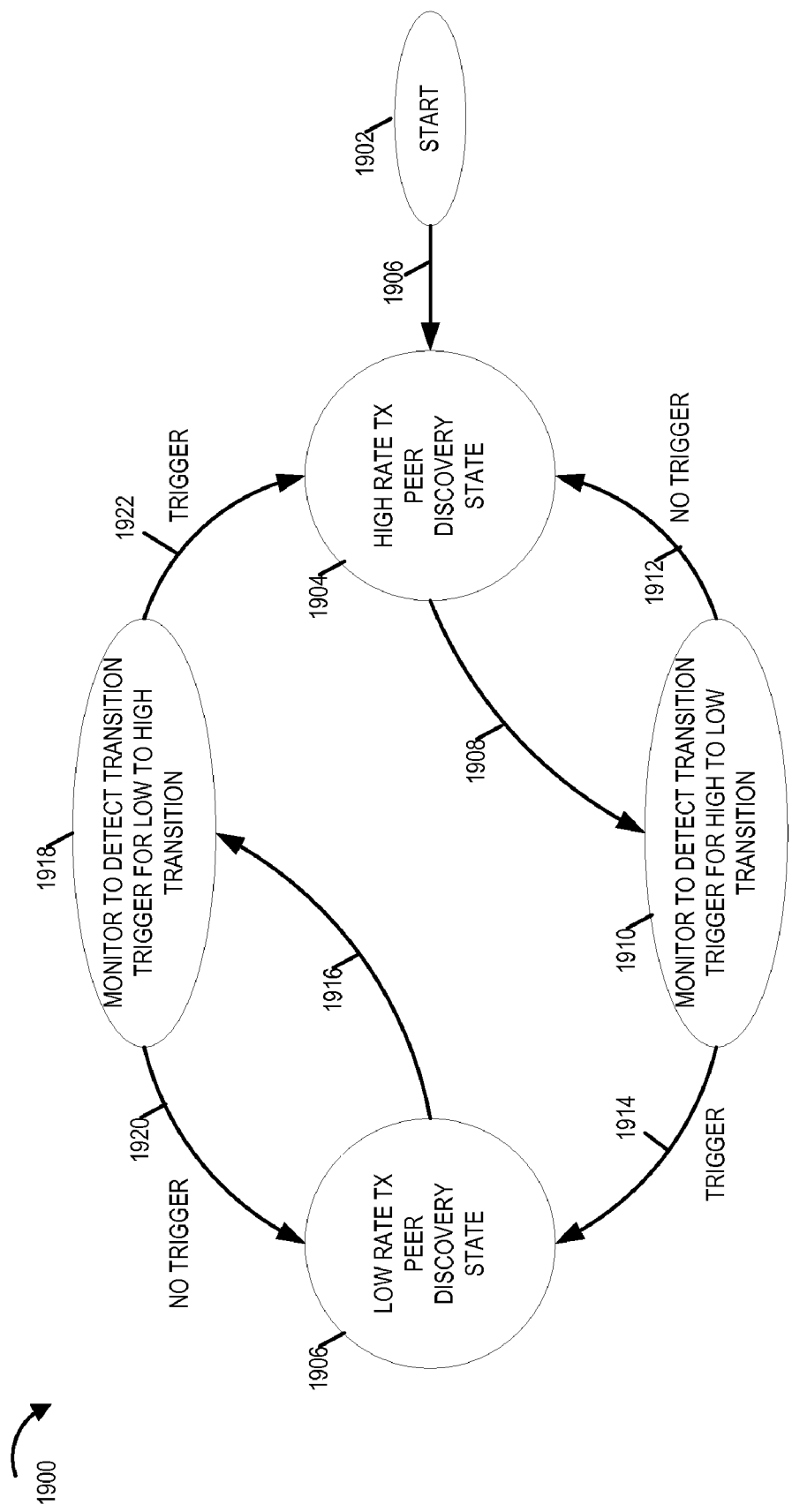
FIG. 19 is a drawing illustrating exemplary operations in a communications device supporting a high rate peer discovery transmit mode and a low rate peer discovery transmit mode in accordance with an exemplary embodiment.

FIG. 19 is a drawing 1900 illustrating exemplary operations in a communications device supporting a high rate peer discovery transmit (TX) mode and a low rate peer discovery transmit (TX) mode in accordance with an exemplary embodiment. Drawing 1900 may correspond to flowchart 1500 of FIG. 15 and/or communications device 1600 of FIG. 16.

Operation of the communications device starts in start step 1902, where the communications device is powered on an initialized. In this embodiment, following power on, the communications device is set into the high rate transmit peer discovery state 1904, as indicated by arrow 1906. While in the high rate transmit peer discovery state 1904, the communications device transmits discovery information signals conveying discovery information portions at a high rate. While in the high rate TX peer discovery state 1904, the communications device also, on an ongoing basis, performs monitoring to detect a transition trigger for a high to low transition as indicated by arrow 1908 and operation 1910. Some exemplary transition triggers are described with respect to block 1528 of flowchart 1500 of FIG. 15. If the monitoring of operation 1910 does not detect a trigger, then the communications device continues in high rate TX peer discovery state 1904 as indicated by arrow 1912. However, if the monitoring of operation 1910 does detect a trigger, then the communications device transitions to the low rate TX peer discovery state 1906 as indicated by arrow 1914.

While in the low rate transmit peer discovery state 1906, the communications device transmits discovery information signals conveying discovery information portions at a low rate. While in the low rate TX peer discovery state 1906, the communications device also, on an ongoing basis, performs monitoring to detect a transition trigger for a low to high transition as indicated by arrow 1916 and operation 1918. Some exemplary transition triggers are described with respect to block 1506 of flowchart 1500 of FIG. 15. If the monitoring of operation 1918 does not detect a trigger, then the communications device continues in low rate TX peer discovery state 1906 as indicated by arrow 1920. However, if the monitoring of operation 1918 does detect a trigger, then the communications device transitions to the high rate TX peer discovery state 1904 as indicated by arrow 1922.

Figure 20:
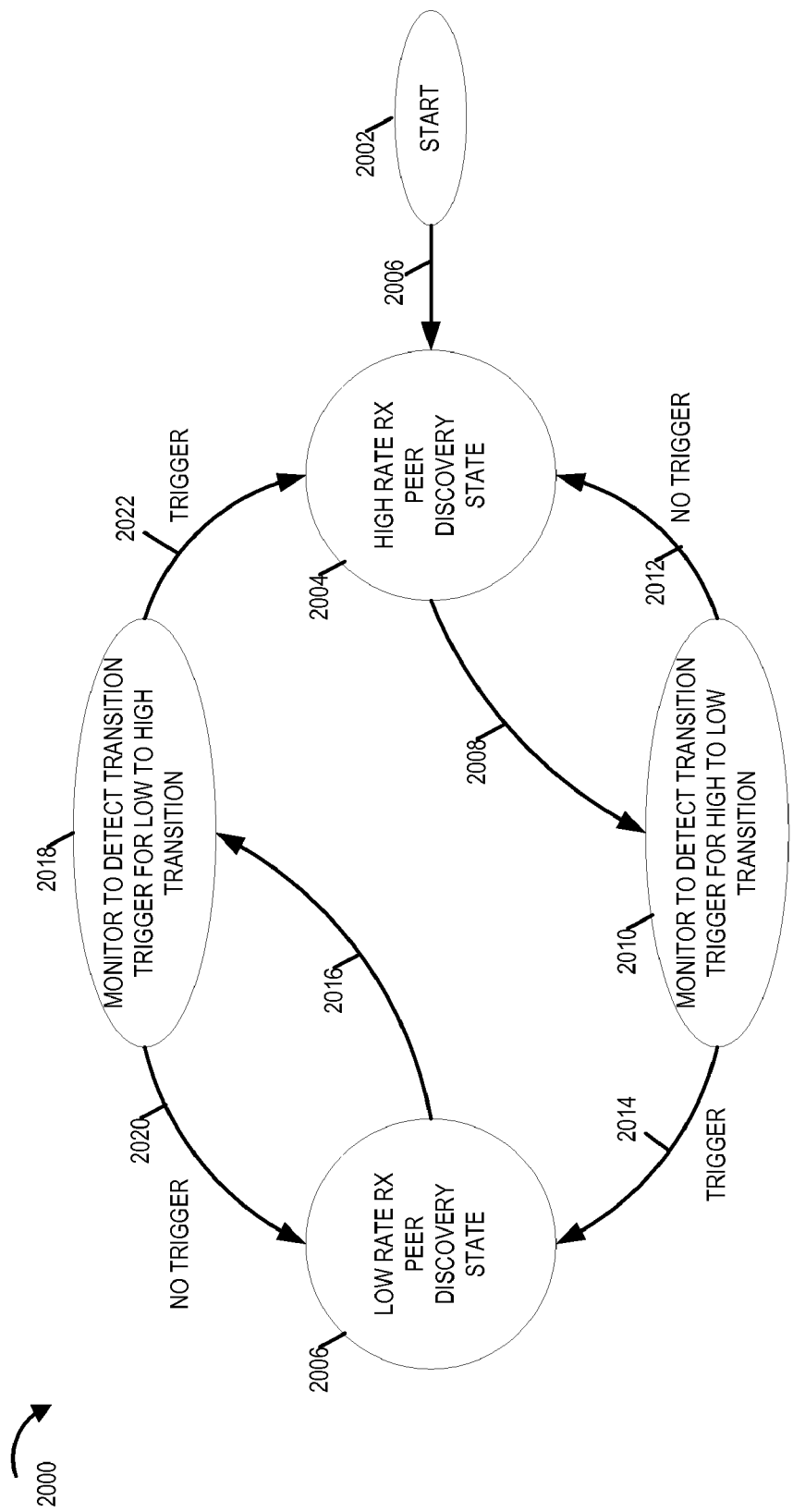
FIG. 20 is a drawing illustrating exemplary operations in a communications device supporting a high rate peer discovery receive mode and a low rate peer discovery receive mode in accordance with an exemplary embodiment.

FIG. 20 is a drawing 2000 illustrating exemplary operations in a communications device supporting a high rate peer discovery receive (RX) mode and a low rate peer discovery receive (RX) mode in accordance with an exemplary embodiment. Drawing 2000 may correspond to flowchart 1700 of FIG. 17 and/or communications device 1800 of FIG. 18.

Operation of the communications device starts in start step 2002, where the communications device is powered on an initialized. In this embodiment, following power on, the communications device is set into the high rate receive peer discovery state 2004, as indicated by arrow 2006. While in the high rate receive peer discovery state 2004, the communications device monitors discovery information signals conveying discovery information portions at a high rate. While in the high rate RX peer discovery state 2004, the communications device also, on an ongoing basis, performs monitoring to detect a transition trigger for a high to low transition as indicated by arrow 2008 and operation 2010. Some exemplary transition triggers are described with respect to block 1728 of flowchart 1700 of FIG. 17. If the monitoring of operation 2010 does not detect a trigger, then the communications device continues in high rate RX peer discovery state 2004 as indicated by arrow 2012. However, if the monitoring of operation 2010 does detect a trigger, then the communications device transitions to the low rate RX peer discovery state 2006 as indicated by arrow 2014.

While in the low rate receive peer discovery state 2006, the communications device monitors discovery information signals conveying discovery information portions at a low rate. While in the low rate RX peer discovery state 2006, the communications device also, on an ongoing basis, performs monitoring to detect a transition trigger for a low to high transition as indicated by arrow 2016 and operation 2018. Some exemplary transition triggers are described with respect to block 1706 of flowchart 1700 of FIG. 17. If the monitoring of operation 2018 does not detect a trigger, then the communications device continues in low rate RX peer discovery state 2006 as indicated by arrow 2020. However, if the monitoring of operation 2018 does detect a trigger, then the communications device transitions to the high rate RX peer discovery state 2004 as indicated by arrow 2022.

In various embodiments, an exemplary communications device supports high and low rate TX peer discovery modes of operation and high and low rate RX peer discovery modes of operation. Thus a communications device may, and sometimes does, perform the methods of both flowchart 1500 of FIG. 15 and flowchart 1700 of FIG. 17 and/or include elements, e.g., a processor, modules and/or memory, etc., described with respect to communications device 1600 of FIG. 16 and communications device 1800 of FIG. 18. In some embodiments, the TX peer discovery modes and the RX peer discovery modes are independent, e.g., with different trigger criteria being implemented to determine transitions for TX modes and RX modes. In some such embodiments a communications device may be, at times, in a high rate transmit peer discovery mode while being in a low rate receive peer discovery mode, or the communications device may alternatively be in a low rate transmit peer discovery mode of operation while being in a high rate receive peer discovery mode of operation.

In some embodiments, TX peer discovery mode transitions are coupled with corresponding RX peer discovery mode transitions, e.g., with a communications device having a peer discovery mode which is applicable to both transmit operations and receive operations.

FIG. 21 is a drawing 2100 illustrating exemplary nodes in a peer to peer communications system and the transmission of discovery information. The exemplary nodes are, e.g., any of the peer to peer communications devices (102, 104, 106, 108, 110) of FIG. 1. The exemplary nodes include a first wireless terminal 2102, e.g., a peer to peer mobile node, which is operating in a high rate discovery mode and which is transmitting discovery information at a high rate, as indicated by discovery signals 2112 being transmitted along time axis 2110. The exemplary nodes also include a second wireless terminal 2104, e.g., a second peer to peer mobile node, which is operating in a low rate discovery mode and which is transmitting discovery information at a low rate, as indicated by discovery signals 2114 being transmitted along time axis 2110. The exemplary nodes also include a third wireless terminal 2106, e.g., a third peer to peer mobile node, which is operating during a first time in a low rate discovery mode and is transmitting discovery information at a low rate, but then changes to operate in a high rate discovery mode and transmits discovery information at a high rate, as indicated by discovery signals 2116 being transmitted along time axis 2110. In some embodiments, at least some of the wireless terminals perform discovery information transmissions in one mode but not the other. In some embodiments, at least some of the wireless terminals are multi-mode with regard to the transmission of discovery information, e.g., transmitting at low rate at some times while transmitting at a high rate at other times.

In some embodiments, it is possible to independently control the rate of sending and/or the rate of monitoring particular portions of peer discovery information. For example, from the senders perspective, over a given period of time multiple peer discovery related advertisements may be sent in parallel, where some are sent at a low rate and others are sent at a high rate. Similarly, from the receivers perspective, when multiple advertisements are being monitored for, some may be monitored at a low rate and others may be monitored at a high rate.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, determining if a change condition occurred to trigger a change from a first peer discovery transmit mode to a second peer discovery transmit mode, transitioning from the first peer discovery transmit mode to the second peer discovery transmit mode, determining if a change condition occurred to trigger a change from the second peer discovery transmit mode to the first peer discovery transmit mode, transitioning from the second peer discovery transmit mode to the first peer discovery transmit mode, determining if a change condition occurred to trigger a change from a first peer discovery receive mode to a second peer discovery receive mode, transitioning from the first peer discovery receive mode to the second peer discovery receive mode, determining if a change condition occurred to trigger a change from the second peer discovery receive mode to the first peer discovery receive mode, transitioning from the second peer discovery receive mode to the first peer discovery receive mode, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a communications device which supports multiple peer discovery modes including a first transmit peer discovery mode during which peer discovery signals are transmitted at a first rate and a second transmit peer discovery mode during which peer discovery signals are transmitted at a second rate, said second rate being higher than the first rate, the method comprising:
   while operating in said first transmit peer discovery mode, determining if a change condition used to trigger a change from the first transmit peer discovery mode to the second transmit peer discovery mode occurred; and
   upon detecting that said change condition used to trigger a change from the first transmit peer discovery mode to the second transmit peer discovery mode has occurred, transitioning from the first transmit peer discovery mode to the second transmit peer discovery mode;
   wherein determining if a change condition used to trigger a change from the first transmit peer discovery mode to the second transmit peer discovery mode occurred includes:
   making said determination as a function of received peer discovery signals.

2. The method of claim 1, wherein making said determination as a function of received peer discovery signals includes:
   determining if a peer discovery signal has been received from a device from which a peer discovery signal was not previously received within a predetermined period of time.

3. The method of claim 1, wherein making said determination as a function of received peer discovery signals includes:
   making said determination as a function of the number newly discovered devices, said number of newly discovered devices being a number of devices from which peer discovery signals are received during a second predetermined time interval but excluding devices from which peer discovery signals were received in a first predetermined period of time prior to said determination.

4. The method of claim 1, wherein making said determination as a function of received peer discovery signals includes:
   determining when the number of different devices from which peer discovery signals are received in a time interval exceeds a threshold number.

5. The method of claim 1, wherein making said determination as a function of received peer discovery signals includes:
   determining if a peer discovery signal includes information indicating that the peer device from which the peer discovery signal was received belongs to a group of devices of interest to said communications device.

6. The method of claim 1, further comprising:
   wherein determining if a change condition used to trigger a change from the first transmit peer discovery mode to the second transmit peer discovery mode occurred includes:
   making said determination as a function of one of i) a change in a set of active applications, ii) a change to an active application, and iii) user input.

7. The method of claim 1, further comprising:
   while operating in said second transmit peer discovery mode, determining if a change condition used to trigger a change from the second transmit peer discovery mode to the first transmit peer discovery mode occurred; and
   upon detecting that said change condition used to trigger a change from the second transmit peer discovery mode to the first transmit peer discovery mode has occurred, transitioning from the second transmit peer discovery mode to the first transmit peer discovery mode.

8. The method of claim 7,
wherein determining if a change condition used to trigger a change from the second transmit peer discovery mode to the first transmit peer discovery mode occurred includes:
making said determination as a function of received peer discovery signals.

9. A communications device which supports multiple peer discovery modes including a first transmit peer discovery mode during which peer discovery signals are transmitted at a first rate and a second transmit peer discovery mode during which peer discovery signals are transmitted at a second rate, said second rate being higher than the first rate, the device comprising:
a first transition condition detection module for determining if a change condition used to trigger a change from the first transmit peer discovery mode to the second transmit peer discovery mode occurred when said communications device is operating in said first transmit peer discovery mode; and
a first mode transition control module for controlling said communications device to transition from the first transmit peer discovery mode to the second transmit peer discovery mode when said first transition condition detection module detects that said change condition used to trigger a change from the first transmit peer discovery mode to the second transmit peer discovery mode has occurred
a wireless receiver module for receiving peer discovery signals, and
wherein said first transition condition detection module makes said determination as a function of a received peer discovery signal.

10. The communications device of claim 9, further comprising:
a new device detection module for determining if a peer discovery signal has been received from a device from which a peer discovery signal was not previously received within a predetermined period of time; and
wherein said first transition condition detection module makes said determination as a function of a new device detection module determination.

11. The communications device of claim 9, further comprising:
a newly discovered device counting module for determining a number of newly discovered devices, said number of newly discovered devices being a number of devices from which peer discovery signals are received during a second predetermined time interval but excluding devices from which peer discovery signals were received in a first predetermined period of time prior to said determination if a change condition has occurred, and
wherein said first transition condition determination module makes said determination as a function of the number of newly discovered devices.

12. The communications device of claim 9, further comprising:
an affiliation determination module for determining if a peer discovery signal includes information indicating that a peer device from which the peer discovery signal was received belongs to a group of devices of interest to said communications device; and
wherein said first transition condition determination module makes said change condition determination as a function of said affiliation determination module determination.

13. A peer to peer communications device which supports multiple peer discovery modes including a first transmit peer discovery mode during which peer discovery signals are transmitted at a first rate and a second transmit peer discovery mode during which peer discovery signals are transmitted at a second rate, said second rate being higher than the first rate, the device comprising:
first transition condition detection means for determining if a change condition used to trigger a change from the first transmit peer discovery mode to the second transmit peer discovery mode occurred when said communications device is operating in said first transmit peer discovery mode; and
first mode transition control means for controlling said communications device to transition from the first transmit peer discovery mode to the second transmit peer discovery mode when said first transition condition detection means detects that said change condition used to trigger a change from the first transmit peer discovery mode to the second transmit peer discovery mode has occurred
wireless receiver means for receiving peer discovery signals, and
wherein said first transition condition detection means makes said determination as a function of a received peer discovery signal.

14. The communications device of claim 13, further comprising:
new device detection means for determining if a peer discovery signal has been received from a device from which a peer discovery signal was not previously received within a predetermined period of time; and
wherein said first transition condition detection means makes said determination as a function of a new device detection means determination.

15. The communications device of claim 13, further comprising:
newly discovered device counting means for determining a number of newly discovered devices, said number of newly discovered devices being a number of devices from which peer discovery signals are received during a second predetermined time interval but excluding devices from which peer discovery signals were received in a first predetermined period of time prior to said determination if a change condition has occurred, and
wherein said first transition condition determination means makes said determination as a function of the number of newly discovered devices.

16. A method of operating a communications device which supports multiple peer discovery modes including a first receive peer discovery mode during which peer discovery signals are monitored at a first rate and a second receive peer discovery mode during which peer discovery signals are monitored at a second rate, said second rate being higher than the first rate, the method comprising:
while operating in said first receive peer discovery mode, determining if a change condition used to trigger a change from the first transmit peer discovery mode to the second transmit peer discovery mode occurred; and
upon detecting that said change condition used to trigger a change from the first transmit peer discovery mode to the second transmit peer discovery mode has occurred, transitioning from the first transmit peer discovery mode to the second transmit peer discovery mode wherein determining if a change condition used to trigger a change from the first transmit peer discovery mode to the second transmit peer discovery mode occurred includes:
making said determination as a function of received peer discovery signals.

17. The method of claim 16, wherein making said determination as a function of received peer discovery signals includes:
determining if a peer discovery signal has been received from a device from which a peer discovery signal was not previously received within a predetermined period of time.

18. The method of claim 16, wherein making said determination as a function of received peer discovery signals includes:
making said determination as a function of the number newly discovered devices, said number of newly discovered devices being a number of devices from which peer discovery signals are received during a second predetermined time interval but excluding devices from which peer discovery signals were received in a first predetermined period of time prior to said determination.

19. The method of claim 16, wherein making said determination as a function of received peer discovery signals includes:
determining when the number of different devices from which peer discovery signals are received in a time interval exceeds a threshold number.

20. The method of claim 16, wherein making said determination as a function of received peer discovery signals includes:
determining if a peer discovery signal includes information indicating that the peer device from which the peer discovery signal was received belongs to a group of devices of interest to said communications device.

21. The method of claim 16, further comprising:
wherein determining if a change condition used to trigger a change from the first transmit peer discovery mode to the second transmit peer discovery mode occurred includes:
making said determination as a function of one of i) a change in a set of active applications, ii) a change to an active application, and iii) user input.

22. The method of claim 16, further comprising:
while operating in said second receive peer discovery mode, determining if a change condition used to trigger a change from the second transmit peer discovery mode to the first transmit peer discovery mode occurred; and
upon detecting that said change condition used to trigger a change from the second transmit peer discovery mode to the first transmit peer discovery mode has occurred, transitioning from the second transmit peer discovery mode to the first transmit peer discovery mode.

23. The method of claim 22,
wherein determining if a change condition used to trigger a change from the second transmit peer discovery mode to the first transmit peer discovery mode occurred includes:
making said determination as a function of received peer discovery signals.

24. A communications device which supports multiple peer discovery modes including a first receive peer discovery mode during which peer discovery signals are monitored at a first rate and a second receive peer discovery mode during which peer discovery signals are monitored at a second rate, said second rate being higher than the first rate, the device comprising:

a first transition condition detection module for determining if a change condition used to trigger a change from the first transmit peer discovery mode to the second transmit peer discovery mode occurred when said communications device is operating in said first transmit peer discovery mode; and
a first mode transition control module for controlling said communications device to transition from the first transmit peer discovery mode to the second transmit peer discovery mode when said first transition condition detection module detects that said change condition used to trigger a change from the first transmit peer discovery mode to the second transmit peer discovery mode has occurred
a wireless receiver module for receiving peer discovery signals, and
wherein said first transition condition detection module makes said determination as a function of a received peer discovery signal.

25. The communications device of claim 24, further comprising:
a new device detection module for determining if a peer discovery signal has been received from a device from which a peer discovery signal was not previously received within a predetermined period of time; and
wherein said first transition condition detection module makes said determination as a function of a new device detection module determination.

26. The communications device of claim 24, further comprising:
a newly discovered device counting module for determining a number of newly discovered devices, said number of newly discovered devices being a number of devices from which peer discovery signals are received during a second predetermined time interval but excluding devices from which peer discovery signals were received in a first predetermined period of time prior to said determination if a change condition has occurred, and
wherein said first transition condition determination module makes said determination as a function of the number of newly discovered devices.

27. The communications device of claim 24, further comprising:
an affiliation determination module for determining if a peer discovery signal includes information indicating that a peer device from which the peer discovery signal was received belongs to a group of devices of interest to said communications device; and
wherein said first transition condition determination module makes said change condition determination as a function of said affiliation determination module determination.

28. A peer to peer communications device which supports multiple peer discovery modes including a first receive peer discovery mode during which peer discovery signals are monitored at a first rate and a second receive peer discovery mode during which peer discovery signals are monitored at a second rate, said second rate being higher than the first rate, the device comprising:
first transition condition detection means for determining if a change condition used to trigger a change from the first transmit peer discovery mode to the second transmit peer discovery mode occurred when said communications device is operating in said first transmit peer discovery mode; and first mode transition control means for controlling said communications device to transition from the first transmit peer discovery mode to the second transmit peer discovery mode when said first transition condition detection means detects that said change condition used to trigger a change from the first transmit peer discovery mode to the second transmit peer discovery mode has occurred;

wireless receiver means for receiving peer discovery signals, and wherein said first transition condition detection means makes said determination as a function of a received peer discovery signal.

29. The communications device of claim 28, further comprising:

new device detection means for determining if a peer discovery signal has been received from a device from which a peer discovery signal was not previously received within a predetermined period of time; and wherein said first transition condition detection means makes said determination as a function of a new device detection means determination.

30. The communications device of claim 28, further comprising:

newly discovered device counting means for determining a number of newly discovered devices, said number of newly discovered devices being a number of devices from which peer discovery signals are received during a second predetermined time interval but excluding devices from which peer discovery signals were received in a first predetermined period of time prior to said determination if a change condition has occurred, and wherein said first transition condition determination means makes said determination as a function of the number of newly discovered devices.

* * * * *